(12) United States Patent
Shimizu

(10) Patent No.: US 8,659,660 B2
(45) Date of Patent: Feb. 25, 2014

(54) CALIBRATION APPARATUS AND CALIBRATION METHOD

(75) Inventor: Seiya Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 381 days.

(21) Appl. No.: 12/947,660

(22) Filed: Nov. 16, 2010

(65) Prior Publication Data

US 2011/0115922 A1    May 19, 2011

(30) Foreign Application Priority Data

Nov. 17, 2009    (JP) ................................. 2009-262358

(51) Int. Cl.
*H04N 17/00* (2006.01)
(52) U.S. Cl.
USPC .................................. 348/148; 348/E13.016
(58) Field of Classification Search
None
See application file for complete search history.

(56) References Cited

U.S. PATENT DOCUMENTS

| 5,768,443 | A | 6/1998 | Michael et al. |
| 6,542,840 | B2 | 4/2003 | Okamoto et al. |
| 6,813,371 | B2 | 11/2004 | Kakinami |
| 2008/0231710 | A1* | 9/2008 | Asari et al. ..................... 348/187 |
| 2009/0299684 | A1* | 12/2009 | Imanishi et al. ............... 702/150 |
| 2010/0097444 | A1* | 4/2010 | Lablans .......................... 348/46 |

FOREIGN PATENT DOCUMENTS

| EP | 1378790 | 1/2004 |
| EP | 1968011 | 9/2008 |
| JP | 2001-245326 A | 9/2001 |
| JP | 2001-285681 A | 10/2001 |
| JP | 2008-187566 A | 8/2008 |

OTHER PUBLICATIONS

"Extended European Search Report" mailed by EPO and corresponding to European application No. 10190732.7 on Apr. 11, 2011.
Radke, Richard J. "A Survey of Distributed Computer Vision Algorithms", Retrieved from the Internet: URL:http://citeseerx.ist.psu.edu/viewdoc/summary?doi=10.1.1.165.1247 [retrieved on Mar. 14, 2011] Section 4.2: Overlapping Camera Calibration 2008, pp. 1-21.

* cited by examiner

*Primary Examiner* — Joseph Ustaris
*Assistant Examiner* — William Adrovel
(74) *Attorney, Agent, or Firm* — Fujitsu Patent Center

(57) ABSTRACT

A calibration apparatus for executing a camera calibration for each of a plurality of cameras mounted on an object so that image capturing ranges of two of the plurality of cameras overlap each other, the calibration apparatus includes an image obtaining unit configured to obtain first and second images captured by the two cameras, a temporary link structure forming unit configured to form a temporary link structure by using the first and second images including images of markers sets, a link angle determining unit configured to determine an effective link angle to form an effective link structure from the temporary link structure, and a parameter determining unit configured to determine a parameter for positioning at least one of the cameras on the basis of the effective link angle.

16 Claims, 17 Drawing Sheets

CAMERA COORDINATE AXIS SYSTEM

VEHICLE ENTIRETY COORDINATE SYSTEM

CALIBRATION APPARATUS AND CALIBRATION METHOD

CROSS-REFERENCE TO RELATED APPLICATION

This application is based upon and claims the benefit of priority of the prior Japanese Patent Application No. 2009-262358, filed on Nov. 17, 2009, the entire contents of which are incorporated herein by reference.

FIELD

The embodiments discussed herein are related to a calibration apparatus, a calibration method and a computer readable storage medium storing a calibration program.

BACKGROUND

In recent years, techniques of mounting one or more cameras on a vehicle and providing images captured outside the vehicle to a driver or the like have been put to practical use (e.g., around view monitors). These cameras are subjected to calibration because the image capturing ranges of the cameras are out of alignment owing to the method of mounting the cameras. Calibration is obtaining the coordinates, depression angle, rotation angle and camera pan angle of a camera. The out-of-alignment image capturing ranges are corrected based on camera parameters obtained using the results of calibration.

Hitherto, the cameras are calibrated by, for example, fixing a grid-shaped target device to the vehicle with a fixture and maintaining the space between the vehicle and the target device in a predetermined state.

Another available technique is generating, for example, a down shot image of the surroundings of the vehicle by using images captured with the cameras mounted on the vehicle. This technique performs calibration of each of the cameras mounted on the vehicle and generates a down shot image. For example, this technique obtains a street projection image of the above-described target device for each of the cameras mounted on the vehicle. For the obtained street projection images, when four cameras are mounted on the vehicle, this technique searches for a combination where 32 parameters in a homography matrix are optimum. A down shot image is generated based on the parameters detected by the search.

However, the place where the target device is fixed needs to be strict when the cameras are subjected to calibration using the above-described available techniques. This places a great burden on a user. The above-described available techniques also take a great processing time in deriving the parameters.

The followings are reference documents.
[Patent Document 1] Japanese Laid-open Patent Publication No. 2001-285681
[Patent Document 2] Japanese Laid-open Patent Publication No. 2008-187566

SUMMARY

According to an aspect of the embodiment, an calibration apparatus for executing a camera calibration for each of a plurality of cameras mounted on an object so that image capturing ranges of two of the plurality of cameras overlap each other, the calibration apparatus includes an image obtaining unit configured to obtain first and second images captured by the two cameras, the first image including images of a first marker set and a second marker set, the second image including images of a first marker set and a third marker set, each of the first, second and third marker sets including a plurality of markers, a temporary link structure forming unit configured to detect the image of the first marker set of the obtained first image and the image of the first marker set of the obtained second image, form a first line connecting a first reference point which is at a predetermined position in the image of the first marker set and a second reference point which is at a predetermined position in the image of the second marker set in the obtained first image, form a second line connecting a first reference point which is at a predetermined position in the image of the first marker set and a third reference point which is at a predetermined position in the image of the third marker set in the obtained second image, arrange the first and second lines so that the first reference points in the obtained first and second images are caused to match each other, and form a temporary link structure including the first and second lines through the matched first reference point and a temporary link angle between the first and second lines, a link angle determining unit configured to determine, as an effective link angle to form an effective link structure from the temporary link structure, the temporary link angle in the case that a difference representing a distance between the images of the same marker of the first marker set in the arranged first and second images is at a minimum, and a parameter determining unit configured to determine a parameter for positioning at least one of the cameras on the basis of the effective link angle determined by the link angle determining unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present techniques will be explained with reference to accompanying drawings.

Hereinafter, embodiments of a calibration apparatus, a calibration method and a computer readable storage medium storing a calibration program disclosed by the present application will be described in detail with reference to the drawings. It is to be understood that the following embodiments described later as embodiments of the calibration apparatus are not intended to restrict the techniques disclosed by the present application.

First Embodiment

Figure 1:
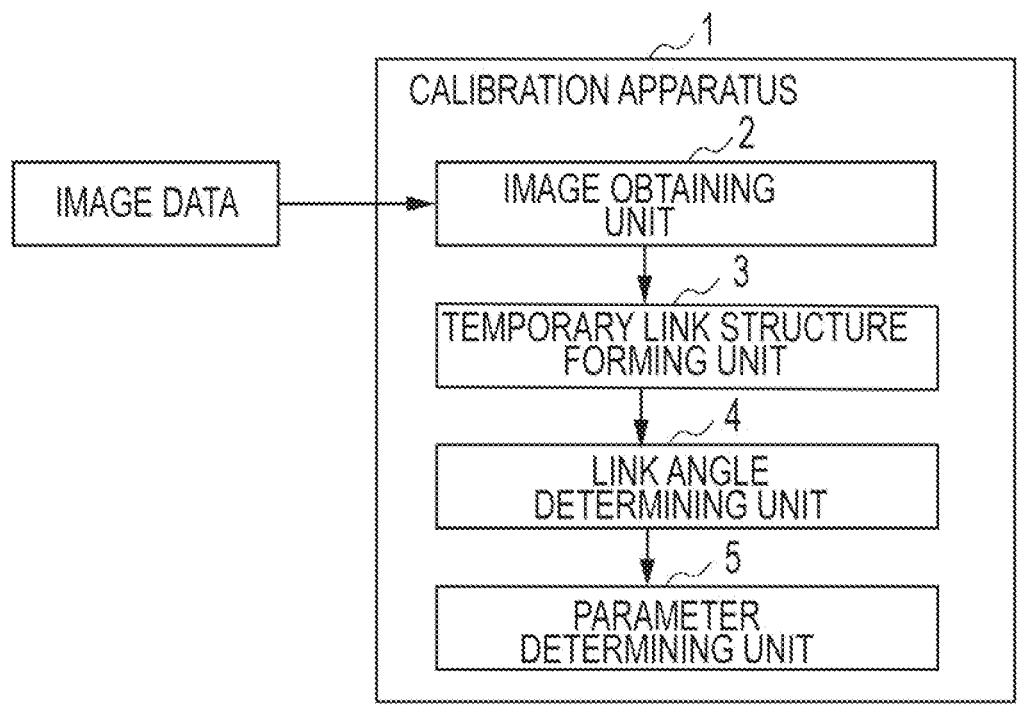
FIG. 1 is a diagram illustrating a calibration apparatus according to a first embodiment.

FIG. 1 is a diagram illustrating a calibration apparatus according to a first embodiment. As illustrated in FIG. 1, a calibration apparatus 1 according to the first embodiment includes an image obtaining unit 2, a link temporary structure forming unit 3, a link angle determining unit 4, and a parameter determining unit 5.

A plurality of jigs each includes a marker set. The marker set includes a plurality of markers a distance between which is predetermined. The plurality of jigs is disposed around an object on which a plurality of cameras to be subjected to calibration is mounted. A vehicle is an example of the object. For example, one jig is disposed at a position at which the image capturing ranges of adjacent vehicle-mounted cameras overlap each other. The vehicle-mounted cameras subjected to calibration capture images of jigs in the image capturing ranges thereof.

The image obtaining unit 2 obtains images of the jigs from the cameras subjected to calibration. For example, the image obtaining unit 2 obtains, from each vehicle-mounted camera, an image of two jigs captured by each vehicle-mounted camera.

The temporary link structure forming unit 3 detects images of the jigs in each of the images obtained by the image obtaining unit 2. The temporary link structure forming unit 3 forms a temporary link structure in which, for images of the same jig whose images are overlappingly captured using a plurality of cameras, predetermined representative points that are common to each of the detected jigs are caused to match each other.

The link angle determining unit 4 sets an arbitrary link angle for the temporary link structure formed by the temporary link structure forming unit 3, and determines the posture of the temporary link structure. The link angle determining unit 4 searches for an effective link angle of an effective link structure at which the sum of the squared differences representing the distances between the same markers included in the same jig is at a minimum.

The parameter determining unit 5 calculates a camera pan angle, an x-axis coordinate, and a y-axis coordinate using the link angle detected by the search conducted by the link angle determining unit 4.

The calibration apparatus 1 forms a temporary link structure in which, for images of the same jig whose images are overlappingly captured using a plurality of cameras, predetermined representative points (e.g., points corresponding to the barycentric positions) that are common to each of jigs specified in each of the images are caused to match each other. Accordingly, the calibration apparatus 1 is able to greatly reduce the number of other parameters involved in calculation of camera parameters. In this manner, the calibration apparatus 1 is able to easily perform camera calibration in a short time.

Second Embodiment

Configuration in the Second Embodiment

Figure 2:
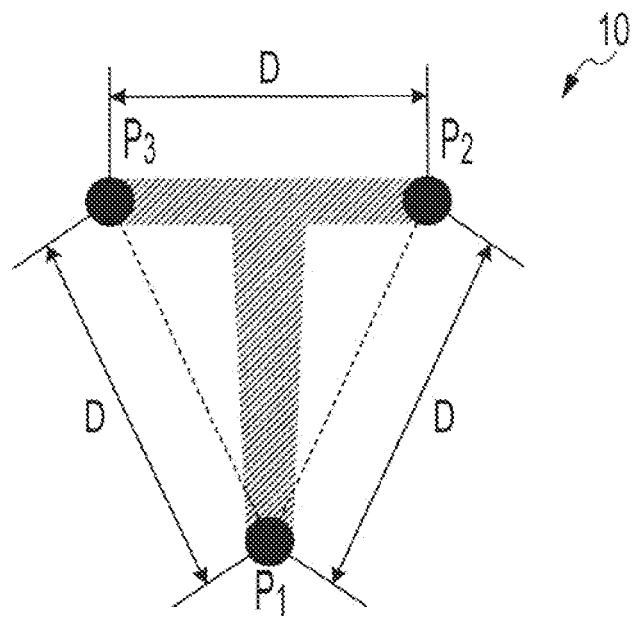
FIG. 2 is a diagram illustrating the configuration of a jig.

FIG. 2 is a diagram illustrating the configuration of a jig. FIG. 2 illustrates the configuration of a jig disposed around the vehicle, which is seen from a vertical direction. As illustrated in FIG. 2, a jig 10 has markers $P_1$ to $P_3$ at respective vertices. The distance between two of the markers is set to D (constant). To execute calibration of cameras mounted on the vehicle, the jig 10 is fixed with a fixture to a predetermined position around the vehicle where the image capturing ranges of adjacent vehicle-mounted cameras overlap each other, and the space between the jig 10 and the vehicle is maintained in a predetermined state.

Figure 3:
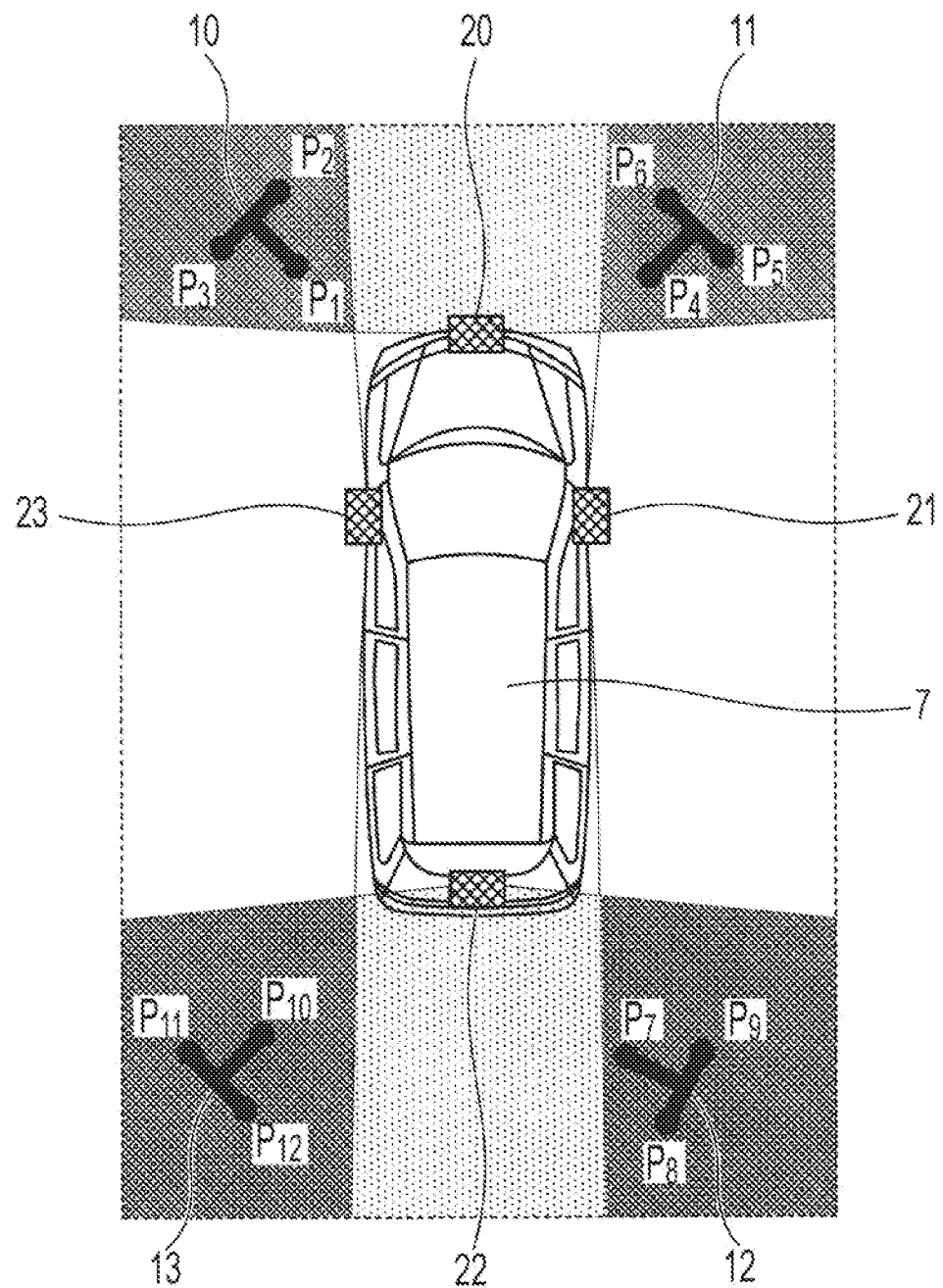
FIG. 3 is a diagram illustrating the positional relationship between cameras mounted on a vehicle and jigs.

FIG. 3 is a diagram illustrating the positional relationship between cameras mounted on the vehicle and jigs. FIG. 3 illustrates a state in which the relationship between the cameras and the jigs are seen from a vertical direction. As illustrated in FIG. 2, cameras 20 to 23 are mounted at the front, right, back, and left of a vehicle 7 so that the image capturing ranges of adjacent cameras overlap each other.

As illustrated in FIG. 3, a jig 11 is disposed in a region where the image capturing range of the camera 20 and the image capturing range of the camera 21 overlap each other. Also, as illustrated in FIG. 3, a jig 12 is disposed in a region where the image capturing range of the camera 21 and the image capturing range of the camera 22 overlap each other. Also, as illustrated in FIG. 3, a jig 13 is disposed in a region where the image capturing range of the camera 22 and the image capturing range of the camera 23 overlap each other. Also, as illustrated in FIG. 3, the jig 10 is mounted in a region where the image capturing range of the camera 23 and the image capturing range of the camera 20 overlap each other. The jigs 10 to 13 have the same structure (see FIG. 2). As illustrated in FIG. 3, the jig 11 has makers $P_4$ to $P_6$ at respective vertices. The jig 12 has markers $P_7$ to $P_9$ at respective vertices. The jig 13 has markers $P_{10}$ to $P_{12}$ at respective vertices.

Figure 4:
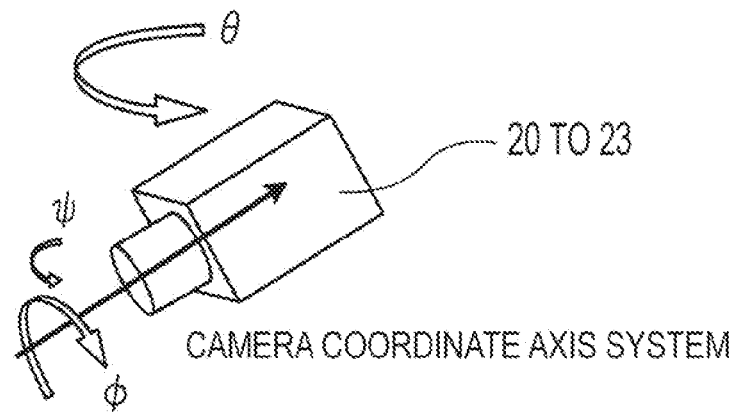
FIG. 4 is a diagram describing parameters of each camera.
Figure 5:
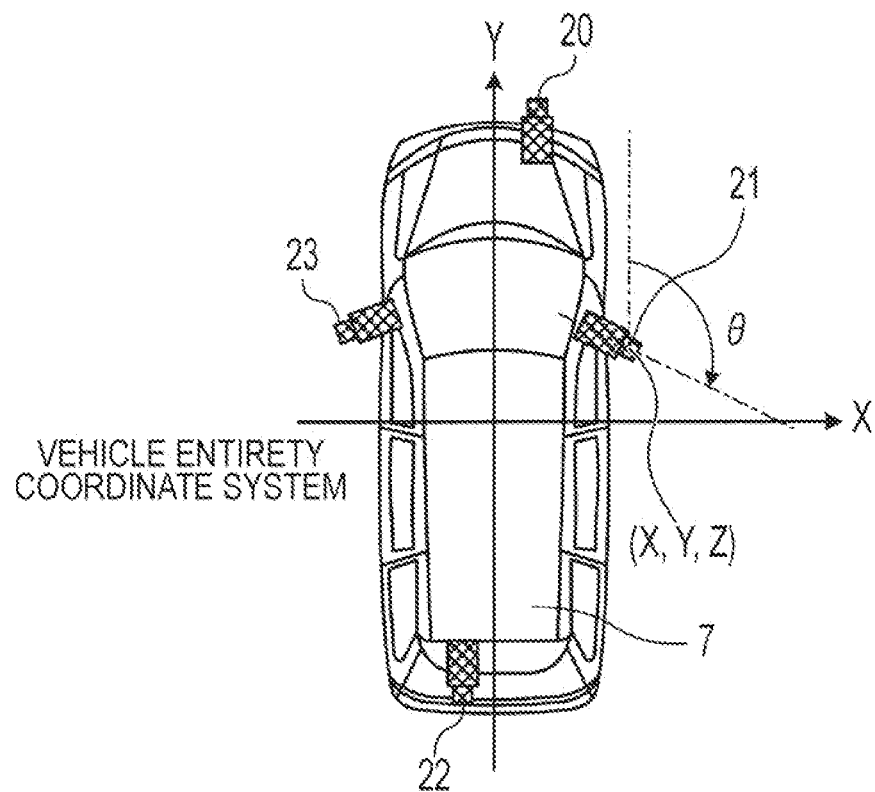
FIG. 5 is a diagram describing parameters of each camera.

FIGS. 4 and 5 are diagrams describing camera parameters. As illustrated in FIG. 4, the parameters of the cameras 20 to 23 mounted on the vehicle include a depression angle $\psi$, a rotation angle $\phi$, and a camera pan angle $\theta$ of each camera in the camera coordinate axis system. As illustrated in FIG. 5, the parameters further include three-dimensional coordinates (x, y, z) of each camera in the vehicle entirety coordinate system. The camera coordinate axis system is a coordinate system in which the depression angle ψ, the rotation angle φ, and the camera pan angle θ of a camera are determined based on a predetermined reference point and a reference axis set in the camera. The vehicle entirety coordinate system is, as illustrated in FIG. 5, a coordinate system in which, when the vehicle 7 is seen from a vertical direction, the horizontal direction in plane orthogonal to the vertical direction serves as the X-axis and the vertical direction serves as the Y-axis.

Hereinafter, a method of calculating the parameters (ψ, θ, φ, x, y, z) of each camera using a calibration apparatus according to a second embodiment will be described. The calibration apparatus according to the second embodiment calculates parameters (ψ, φ, z) of the individual cameras 20 to 23 and then calculates mutual parameters (θ, x, y) of the cameras 20 to 23.

[Calculation of Parameters (ψ, φ, z) of Individual Cameras]

The calibration apparatus according to the second embodiment obtains images captured using the individual cameras, and performs a pointing process of detecting the positions (coordinates in the images; hereinafter referred to as "image coordinates") of markers of jigs included in the obtained images.

The pointing process may be performed in terms of image processing, or alternatively, a user may interactively perform the pointing process using a pointing device. When the pointing process is performed in terms of image processing, light-emitting diodes (LEDs) that emit light or blink may be used as markers so as to facilitate specification of the positions of the markers. Further, when the pointing process is performed in terms of image processing, a set of blinking neighboring pixels exhibiting the same light emitting pattern may be collectively recognized as a marker.

Figure 6:
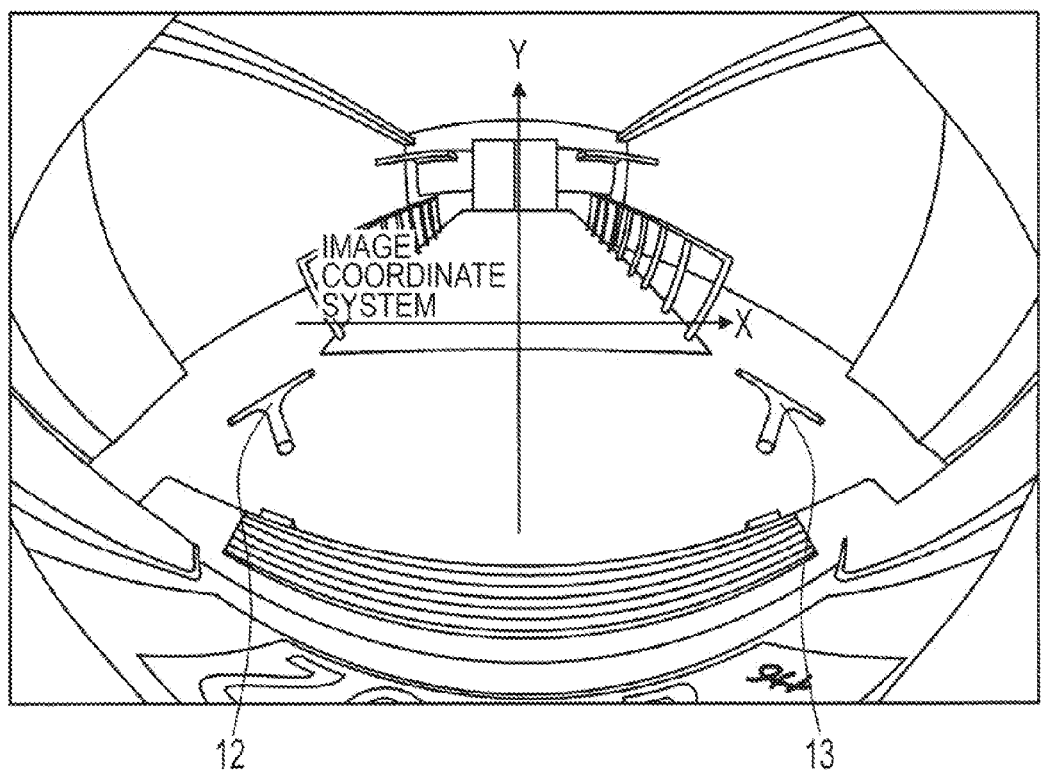
FIG. 6 is a diagram illustrating an example of an image captured using a camera.

FIG. 6 is a diagram illustrating an example of an image captured using a camera. As illustrated in FIG. 3 described above, when the jigs 10 to 13 are disposed around the vehicle 7, the cameras 20 to 23 each capture an image of two jigs. For example, as illustrated in FIG. 6, the camera 22 captures an image of the jigs 12 and 13. The image coordinate system is a coordinate system in which the horizontal direction in plane orthogonal to the camera's image capturing direction serves as the X-axis, and the vertical direction serves as the Y-axis.

The calibration apparatus according to the second embodiment specifies the image coordinates of a marker, and then converts the specified image coordinates (X, Y coordinates in the image coordinate system) into a viewing vector in the camera coordinate axis system. The viewing vector is a direction vector of a line connecting the optical center of the camera and the marker of the jig, which is in the opposite direction to the direction of incident light emitted from the marker to a lens. Regarding the direction of the viewing vector, it is assumed that the direction from the optical center to the marker is the positive direction.

Because the relationship between the direction of incident light emitted from the marker to the lens and the image capturing position is fixed in accordance with the camera and the lens system, the user is able to generate, in advance, a conversion table for image coordinates and a viewing vector. The calibration apparatus according to the second embodiment converts image coordinates into a viewing vector using the conversion table generated in advance by the user.

For example, the markers of two jigs in an image are represented as $P_n$ (n=1 to 6), and viewing vectors of the individual markers are represented as $v_1$ to $v_6$. The position of a marker $P_n$ (n=1 to 6) in the camera coordinate system is represented as $P_n^{CAM}$. Since $P_n^{CAM}$ is in the viewing vector direction from the origin of the camera coordinate system, the relationship expressed in equation (1) below holds true. In equation (1), $k_n$ is a positive constant value (unknown amount):

$$P_n^{CAM} = k_n \times v_n \quad (1)$$

Figure 7:
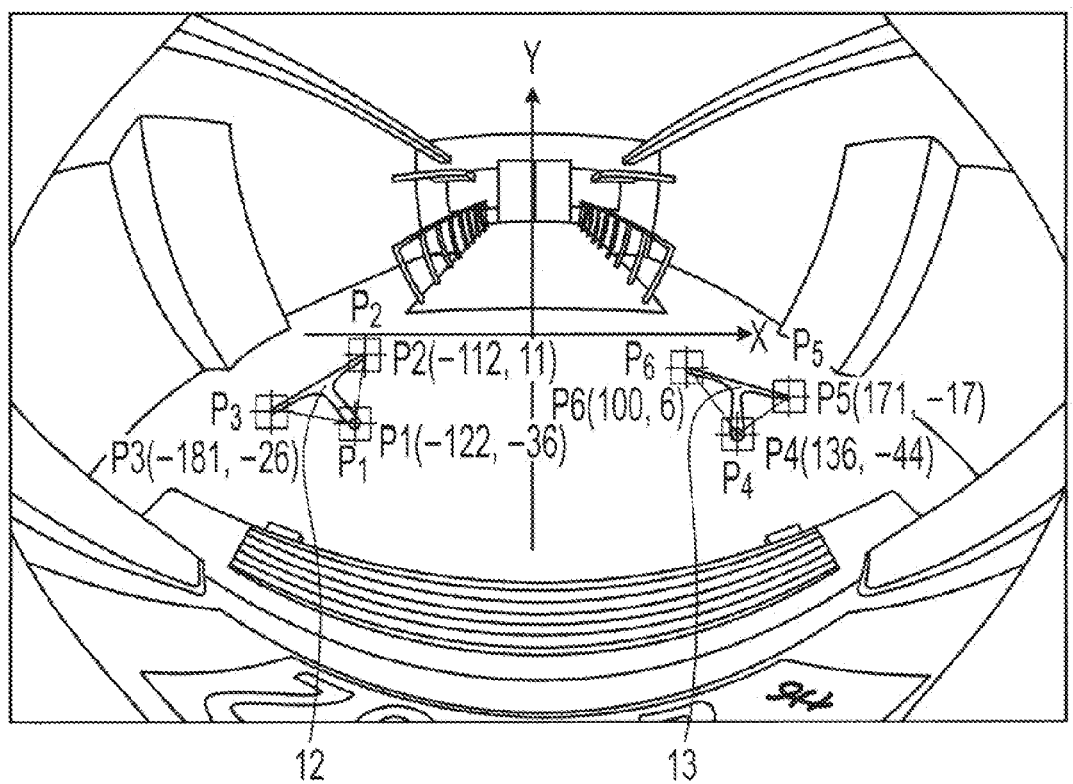
FIG. 7 is a diagram illustrating the result of specifying the image coordinates of markers.

FIG. 7 is a diagram illustrating the result of specifying the image coordinates of markers. For example, the result of specifying the image coordinates as illustrated in FIG. 7 is obtained when, for example, the jigs 12 and 13 have markers $P_1$ to $P_6$, respectively. For example, as illustrated in FIG. 7, the result of detecting the image of the marker $P_1$ of the jig 12 is P1(−122, −36).

When a normal vector in a plane R where the jigs are disposed is represented as $n_p(n_{px}, n_{py}, n_{pz})$ and the height at which the camera is mounted is represented as H, the intersection $P^{CAM}_0$ of a perpendicular dropped from the origin of the camera coordinate axis system to the plane R and the plane R is expressed as equation (2) below:

$$P_n^{CAM} = -Hn_p \quad (2)$$

Also, the equation of the plane R is equation (3) below:

$$n_{px}(x - P_{0x}^{CAM}) + n_{py}(y - P_{0y}^{CAM}) + n_{pz}(z - P_{0z}^{CAM}) = 0 \quad (3)$$

Figure 8:
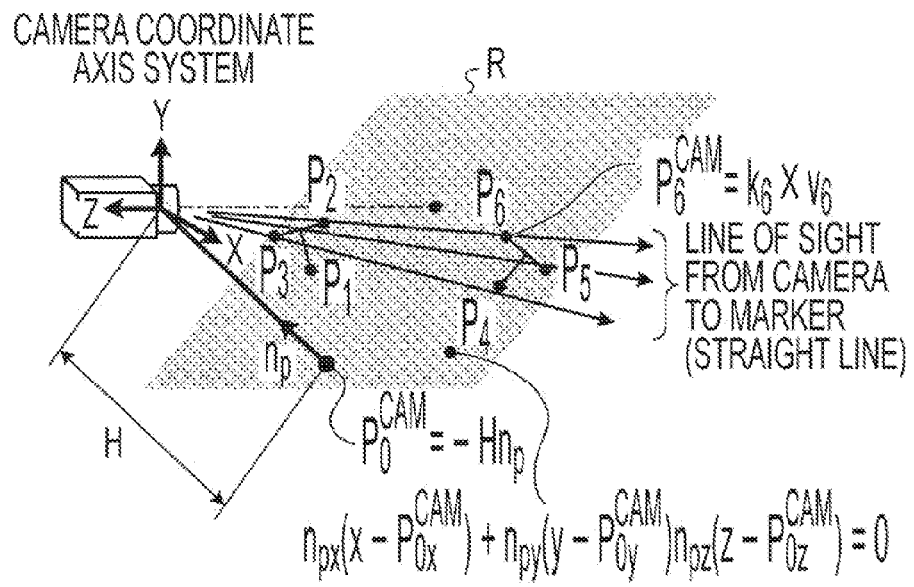
FIG. 8 is a diagram illustrating the relationship between equations (1) to (3)

Here, the relationship among equations (1) to (3) described above is illustrated as in FIG. 8. FIG. 8 is a diagram illustrating the relationship among equations (1) to (3).

Using equations (1) and (3) described above, $k_n$ is expressed as equation (4) below:

$$k_n = \frac{n_{px} P_{0x}^{CAM} + n_{py} P_{0y}^{CAM} + n_{pz} P_{0z}^{CAM}}{n_{px} v_{nx} + n_{py} v_{ny} + n_{pz} v_{nz}} \quad (4)$$

When equation (4) described above is substituted in equation (1), the position $P^{CAM}_n$ of each marker in the camera coordinate axis system is expressed as equation (5) below:

$$P_n^{CAM} = \frac{n_{px} P_{0x}^{CAM} + n_{py} P_{0y}^{CAM} + n_{pz} P_{0z}^{CAM}}{n_{px} v_{nx} + n_{py} v_{ny} + n_{pz} v_{nz}} \times V_n \quad (5)$$

That is, using equations (2) and (5) described above, the position of each marker of each jig is expressed as a function with the height H at which the camera is mounted and the normal vector $n_p$ as variables.

As illustrated in FIG. 2 above, since the distance D between markers ($P_1$ and $P_2$, $P_2$ and $P_3$, $P_3$ and $P_1$) existing on the same jig is constant, an evaluation function E with the height H at which the camera is mounted and the normal vector $n_p$ as arguments is defined as equation (6) below:

$$E(H, n_p) = (|P_1^{CAM} - P_2^{CAM}| - D)^2 + (|P_2^{CAM} - P_3^{CAM}| - D)^2 + \\ (|P_3^{CAM} - P_1^{CAM}| - D)^2 + (|P_4^{CAM} - P_5^{CAM}| - D)^2 + \\ (|P_5^{CAM} - P_6^{CAM}| - D)^2 + (|P_6^{CAM} - P_4^{CAM}| - D)^2 \quad (6)$$

Equation (6) (evaluation function E) becomes 0 when H and $n_p$ take correct values. Therefore, the plane R in the camera coordinate system is determined by obtaining H and $n_p$ that minimize the value of equation (6). H and $n_p$ are obtained using a numerical analysis such as the method of steepest descent from appropriate initial values that minimize equation (6) (for example, initial values are predetermined in advance by a user). Among the individual camera parameters, "z" is the distance between the plane R and the origin of the camera coordinate system, namely, H.

Figure 9:
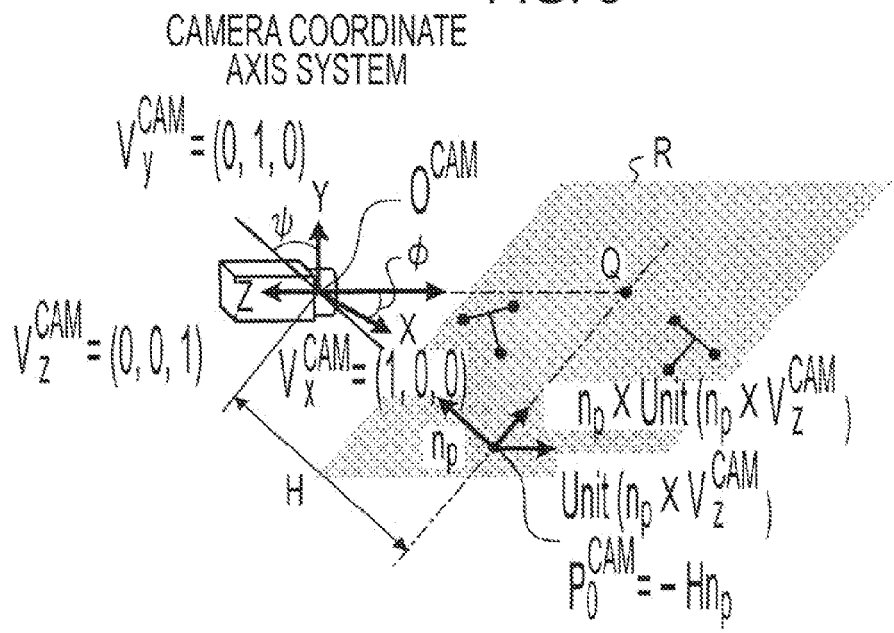
FIG. 9 is a diagram illustrating a method of calculating a parameter ψ of each camera.

Among the individual camera parameters, "$\psi$" and "$\phi$" are calculated from an angle formed by the normal vector $n_p$ of the plane R and each axis of the camera coordinate system. FIG. 9 is a diagram describing a method of calculating the camera parameter $\psi$ according to the second embodiment. As illustrated in FIG. 9, when a point on the plane R obtained by extending the z-axis of the camera coordinate system is represented as Q, an angle formed by the normal vector of a triangle connecting the origin $O^{CAM}$ of the camera coordinate system, Q, and $P_0^{CAM}$ and the x-axis of the camera coordinate system is $\phi$. Therefore, the camera parameter "$\phi$" is expressed as equation (7) below:

$$\phi = \arcsin |\text{Unit}(n_p \times V_Z^{CAM}) \times V_X^{CAM}| \quad (7)$$

In equation (7), $V_Z^{CAM}$ is the normal vector $(0, 0, 1)^T$ in the z-axis direction of the camera coordinate axis system; $V_X^{CAM}$ is the normal vector $(1, 0, 0)^T$ in the x-axis direction of the camera coordinate axis system; and Unit( ) is a function for converting a vector into a unit vector.

When the camera coordinate axis system is rotated by $-\phi$, around the x-axis of the camera coordinate system, $\psi$ becomes an angle formed by a normal vector in the rotated y-axis direction (y-coordinate direction of the camera coordinate axis system) and $n_p$. Therefore, the camera parameter "$\psi$" is expressed as equation (8) below. In equation (8), $V_Y^{CAM}$ is the normal vector $(0, 1, 0)^T$ in the y-axis direction:

$$\psi = \arcsin \left| \left( \begin{pmatrix} \cos\phi & \sin\phi & 0 \\ -\sin\phi & \cos\phi & 0 \\ 0 & 0 & 1 \end{pmatrix} \cdot V_Y^{CAM} \right) \times n_p \right| \quad (8)$$

As described above, the calibration apparatus according to the second embodiment is able to calculate the parameters ($\psi$, $\phi$, z) of the individual cameras using equations (1) to (8) described above.

[Calculation of Camera Mutual Parameters ($\theta$, x, y)]

In the following description, parameters of a camera m (m=F, B, R, L) are represented as $\psi_m$, $\phi_m$, $\theta_m$, $x_m$, $y_m$, $z_m$. Unlike calculation of the parameters of the individual cameras, markers disposed at the vertices of each jig are represented as $P_n$ (n=1 to 3). A camera F (Front) represents the camera 20. A camera B (Black) represents the camera 22. A camera R (Right) represents the camera 21. A camera L (Left) represents the camera 23.

Figure 10:
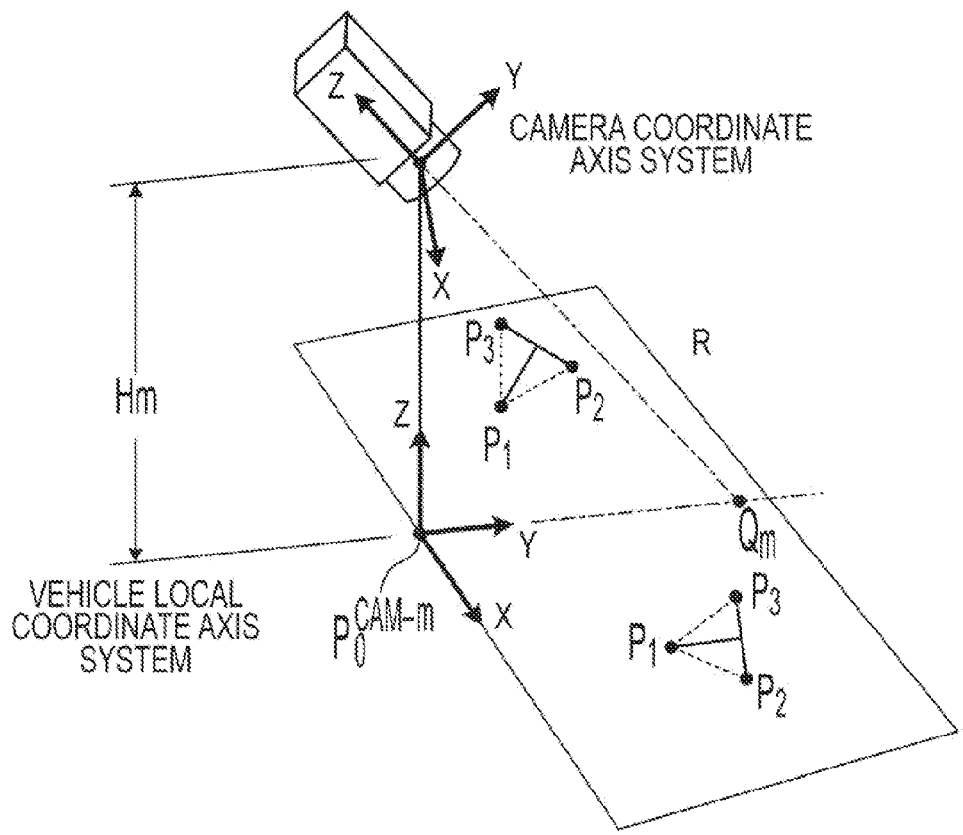
FIG. 10 is a diagram illustrating the relationship between a camera coordinate axis system and a vehicle local coordinate axis system.

FIG. 10 is a diagram illustrating the relationship between the camera coordinate axis system and the vehicle local coordinate axis system according to the second embodiment. As illustrated in FIG. 10, the vehicle local coordinate axis system is an orthogonal coordinate system that has $P_0^{CAM-m}$ set for each camera as the origin. The origin of the camera coordinate axis system exists at a camera mounting height Hm, in the Z-axis direction of the vehicle local coordinate axis system, above the origin $P_0^{CAM-m}$ of the vehicle local coordinate axis system.

A position on the plane R in the vehicle local coordinate axis system corresponding to the position (e.g., $P_1$, $P_2$, $P_3$) of each of the vertices (markers 1 to 3) of each jig in the camera coordinate system of the camera m is represented as $P_n^{CAM-m}$. Since images of the vertices (markers) of each jig are captured using adjacent cameras (see FIG. 3), for example, the position of the marker 1 of the jig 11 whose image is captured using the camera F is represented as $P_1^{CAM-F}$, and the position of the marker 1 of the jig 12 whose image is captured using the camera R is represented as $P_1^{CAM-R}$.

FIGS. 11A to 11D are diagrams illustrating the positions of the vertices of the jigs detected by the cameras according to the second embodiment. In FIGS. 11A to 11D, for each camera, the relative positional relationship between the origin position $P_0^{CAM-m}$ on the plane R in the vehicle local coordinate axis system corresponding to the origin position of the camera coordinate system and each vertex position of each jig in the vehicle local coordinate axis system detected by the camera is illustrated. The calibration apparatus according to the second embodiment detects, from images of the jigs captured using the cameras 20 to 23, the positions of the vertices (markers 1 to 3) of the jigs in the vehicle local coordinate axis system, and obtains the relative positional relationship between each camera and the jigs.

Figure 11A:
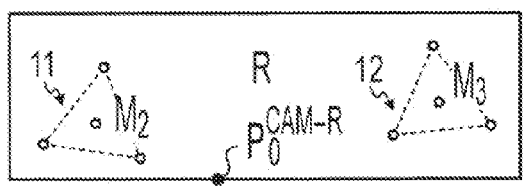
FIGS. 11A to 11D are diagrams illustrating the positions of the vertices of the jigs detected using the respective cameras.
Figure 11B:
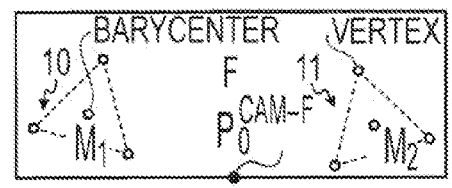
Figure 11C:
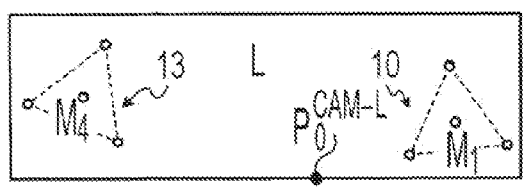
Figure 11D:

For example, the calibration apparatus according to the second embodiment detects the vertices of the jigs 10 and 11 an image of which is captured by the camera 20(F), as illustrated in FIG. 11B. Also, the calibration apparatus detects the vertices of the jigs 11 and 12 in an image captured by the camera 21(R), as illustrated in FIG. 11A. Also, the calibration apparatus detects the vertices of the jigs 12 and 13 in an image captured by the camera 22(B), as illustrated in FIG. 11D. Also, the calibration apparatus detects the vertices of the jigs 10 and 13 in an image captured by the camera 23(L), as illustrated in FIG. 11C. The calibration apparatus according to the second embodiment obtains the relative positional relationship between each camera and the jigs based on the positions of the vertices (markers) of each jig detected for each of the cameras 20 to 23 (F, B, R, L) and the position $P_0^{CAM-m}$ on the plane R corresponding to the origin position of the camera coordinate system.

After obtaining the relative positional relationship between each camera and the jigs, the calibration apparatus according to the second embodiment performs optimization in the vehicle coordinate system (world coordinate system) while maintaining the relative positional relationship between each camera and the jigs.

For example, the calibration apparatus according to the second embodiment determines, for example, a point corresponding to the barycentric position as a representative point that mutually corresponds to the same jigs in two images captured using two cameras. As illustrated in FIGS. 11B and 11C, the calibration apparatus determines a point $M_1$ corresponding to the barycentric position as a representative point of the jig 10. Also, as illustrated in FIGS. 11A and 11B, the calibration apparatus determines a point $M_2$ corresponding to the barycentric position as a representative point of the jig 11. Also, as illustrated in FIGS. 11A and 11D, the calibration apparatus determines a point $M_3$ corresponding to the barycentric position as a representative point of the jig 12. Also, as illustrated in FIGS. 11C and 11D, the calibration apparatus determines a point $M_4$ corresponding to the barycentric position as a representative point of the jig 13.

While maintaining the relative positional relationship between each camera and the jigs (see FIGS. 11A to 11D), the calibration apparatus according to the second embodiment calculates a temporary link structure in which representative points of the same jigs in two images captured using two cameras always match each other. For example, individual camera images in the states illustrated in FIGS. 11A to 11D are translated and/or rotated so that the positions of corresponding representative points match each other in the vehicle coordinate system (world coordinate system).

For example, when the image in FIG. 11B serves as a reference, the image in FIG. 11C is rotated and translated so that the position of the point $M_1$ in the image in FIG. 11B and the position of the point $M_1$ in the image in FIG. 11C match each other. Similarly, processing is performed so that the positions of the other representative points match each other. In this manner, the four images illustrated in FIGS. 11A to 11D are translated and/or rotated to form the effective link structure, which is illustrated in FIG. 12 described below.

Figure 12:
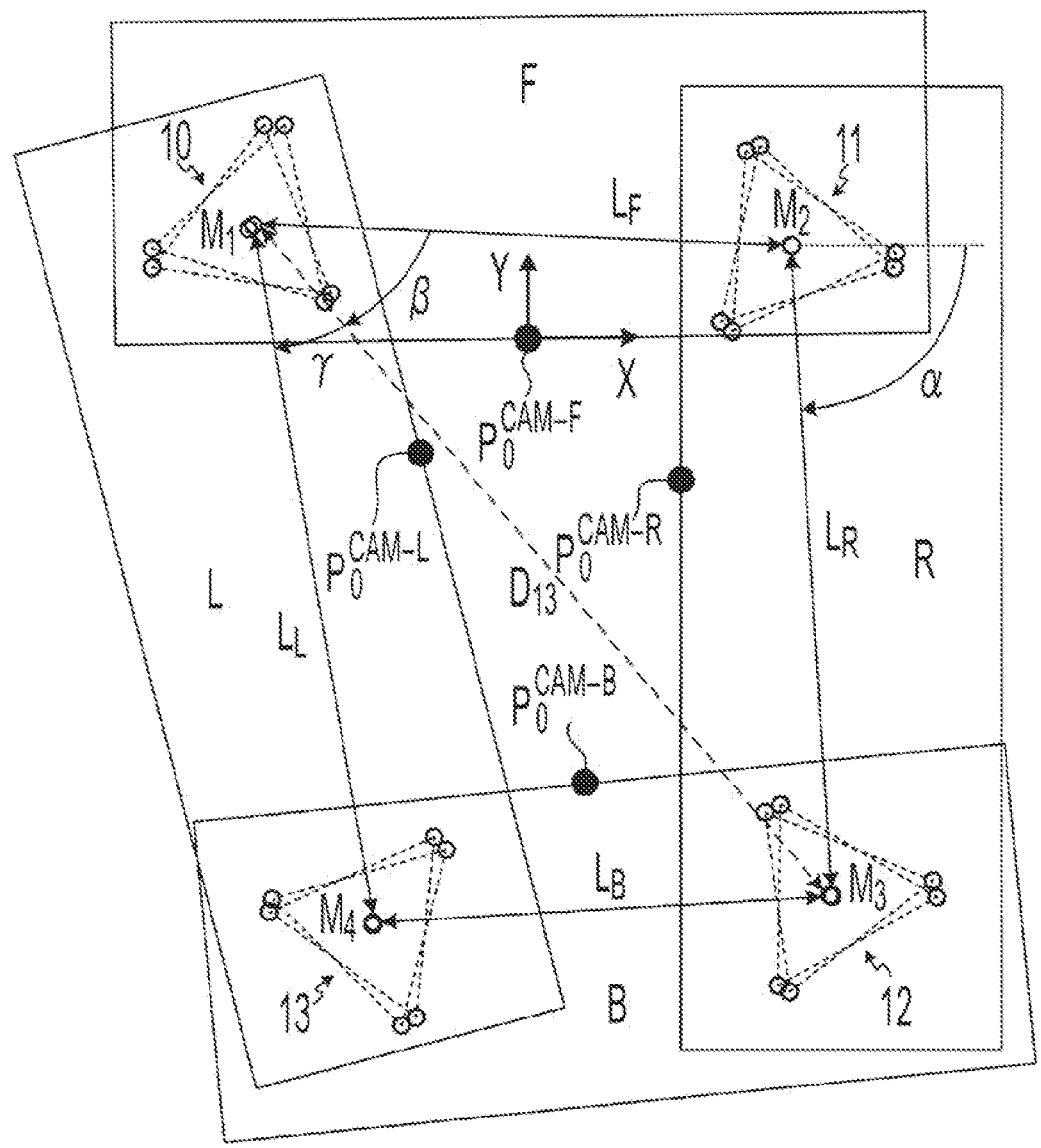
FIG. 12 is a diagram describing calculation of camera mutual parameters according to a second embodiment.

FIG. 12 is a diagram describing calculation of camera mutual parameters according to the second embodiment. For example, as illustrated in FIG. 12, the temporary link structure is such that the point $M_2$ corresponding to the barycentric position of the jig 11 whose image is captured using the camera 20(F) and the point $M_2$ corresponding to the barycentric position of the jig 11 whose image is captured using the camera 21(R) match each other. Also, as illustrated in FIG. 12, the temporary link structure is such that the point $M_3$ corresponding to the barycentric position of the jig 12 whose image is captured using the camera 21(R) and the point $M_3$ corresponding to the barycentric position of the jig 12 whose image is captured using the camera 22(B) match each other. Also, as illustrated in FIG. 12, the temporary link structure is such that the point $M_4$ corresponding to the barycentric position of the jig 13 whose image is captured using the camera 22(B) and the point $M_4$ corresponding to the barycentric position of the jig 13 whose image is captured using the camera 23(L) match each other. Also, as illustrated in FIG. 12, the temporary link structure is such that the point $M_1$ corresponding to the barycentric position of the jig 10 whose image is captured using the camera 23(L) and the point $M_1$ corresponding to the barycentric position of the jig 10 whose image is captured using the camera 20(F) match each other.

The posture of the above-described temporary link structure is established in accordance with the size of a link angle. For example, as illustrated in FIG. 12, regarding the temporary link structure, the length of a link between the point $M_1$ corresponding to the barycentric position of the jig 10 and the point $M_2$ corresponding to the barycentric position of the jig 11 is represented as $L_F$. Also, as illustrated in FIG. 12, the length of a link between the point $M_2$ corresponding to the barycentric position of the jig 11 and the point $M_3$ corresponding to the barycentric position of the jig 12 is represented as $L_R$. Also, as illustrated in FIG. 12, the length of a link between the point $M_3$ corresponding to the barycentric position of the jig 12 and the point $M_4$ corresponding to the barycentric position of the jig 13 is represented as $L_B$. Also, as illustrated in FIG. 12, the length of a link between the point $M_4$ corresponding to the barycentric position of the jig 13 and the point $M_1$ corresponding to the barycentric position of the jig 10 is represented as $L_L$. The length of a line connecting the point $M_1$ and the point $M_2$, the length of a line connecting the point $M_2$ and the $M_3$ point, the length of a line connecting the point $M_3$ and the point $M_4$, and the length of a line connecting the point $M_4$ and the point $M_1$ remain unchanged and are fixed.

As illustrated in FIG. 12, one exterior angle (angle formed by the X-coordinate axis of the vehicle local coordinate axis system and the line connecting the point $M_2$ and the point $M_3$) of a rectangle representing the temporary link structure is represented as a link angle $\alpha$ that establishes the posture of the link structure. The temporary link structure is a structure in which, when the link angle $\alpha$ becomes smaller, the interior angles $M_4M_1M_2$ and $M_2M_3M_4$ of the rectangle representing the link structure become smaller, and, when the link angle $\alpha$ becomes larger, the interior angles $M_1M_2M_3$ and $M_3M_4M_1$ of the rectangle representing the link structure become smaller.

That is, the length of the line $L_F$ connecting the point $M_1$ and the point $M_2$ in FIG. 12 is equal to the length of a line connecting the point $M_1$ and the point $M_2$ illustrated in FIG. 11B.

Also, the length of the line $L_R$ connecting the point $M_2$ and the point $M_3$ is equal to the length of a line connecting the point $M_2$ and the point $M_3$ illustrated in FIG. 11A. Also, the length of the line $L_B$ connecting the point $M_3$ and the point $M_4$ is equal to the length of a line connecting the point $M_3$ and the point $M_4$ illustrated in FIG. 11D. Also, the length of the line $L_L$ connecting the point $M_4$ and the point $M_1$ is equal to the length of a line connecting the point $M_4$ and the point $M_1$ illustrated in FIG. 11C.

The calibration apparatus according to the second embodiment calculates a temporary link structure as illustrated in FIG. 12 described above, that is, a temporary link structure whose vertices are the point $M_1$ of the jig 10, the point $M_2$ of the jig 11, the point $M_3$ of the jig 12, and the point $M_4$ of the jig 13, and whose link angle is $\alpha$. When there are five cameras (M=5) or more, the posture of the link structure in the vehicle coordinate system (world coordinate system) is uniquely set by establishing (M−3) link angles.

[Determination of Posture of Link Structure where Link Angle Serves as Parameter]

The calibration apparatus according to the second embodiment then calculates the position in the vehicle local coordinate system of each jig when the link angle of the temporary link structure is $\alpha$.

For example, the calibration apparatus according to the second embodiment assumes that the vehicle local coordinate axis system of the camera 20(F) and the vehicle coordinate system (world coordinate system) match each other. On this occasion, the coordinates of the point $M_1$ corresponding to the barycentric position of the jig 10 and the coordinates of the point $M_2$ corresponding to the barycentric position of the jig 11 are obtained as known values. Using the link angle $\alpha$ (see FIG. 12), the calibration apparatus expresses the coordinates of the point $M_3$ corresponding to the barycentric position of the jig 12 as equation (9) below. Note that $L_F$, $L_R$, $L_B$, and $L_L$ are known values since $L_F$, $L_R$, $L_B$, and $L_L$ match the inter-barycentric-position distances in the camera coordinate system.

$$M_3 = M_2 + L_R(\cos\alpha, -\sin\alpha) \quad (9)$$

Similarly, when an angle formed by the X-coordinate axis of the vehicle local coordinate axis system and the link $L_L$ is represented as $(\beta+\gamma)$, the point $M_4$ corresponding to the barycentric position of the jig 13 is expressed as equation (10) below:

$$M_4 = M_1 + L_L(\cos(\beta+\gamma), -\sin(\beta+\gamma)) \quad (10)$$

Also, the angle $\beta$ corresponding to the angle $M_2M_1M_3$ is expressed as equation (11) below:

$$\beta = -\arctan 2(M_{3y} - M_{1y}, M_{3x} - M_{1x}) \quad (11)$$

Based on the law of cosines, $L_B^2$ is expressed as equation (12) below, and $\cos\gamma$ is expressed as equation (13) below. Therefore, the angle $\gamma$ corresponding to the angle $M_3M_1M_4$ is expressed as equation (14) below:

$$L_B^2 = D_{13}^2 + L_L^2 - 2RL_L\cos\gamma \quad (12)$$

$$\cos\gamma = \frac{D_{13}^2 + L_L^2 - L_B^2}{2D_{13}L_L} \quad (13)$$

$$\gamma = \arccos \frac{D_{13}^2 + L_L^2 - L_B^2}{2D_{13}L_L} \quad (14)$$

The distance between the point $M_1$ corresponding to the barycentric position of the jig 10 and the point $M_3$ corresponding to the barycentric position of the jig 12 is expressed as equation (15) below:

$$D_{13} = |M_1 - M_3| = \sqrt{(M_{3x} - M_{1x})^2 + (M_{3y} - M_{1x})^2} \quad (15)$$

In this manner, the calibration apparatus according to the second embodiment is able to calculate the position of each jig when the link angle of the temporary link structure (see FIG. 12) is α using equations (9) to (15).

[Calculation of Coordinates of Vertices (Markers) of Each Jig in Vehicle Coordinate System]

Next, the calibration apparatus according to the second embodiment calculates the position (coordinates) in the vehicle coordinate system of each of the vertices (markers) of each jig detected using a specific camera in the above-described temporary link structure (see FIG. 12).

For example, the calibration apparatus according to the second embodiment describes the coordinate values in the vehicle local coordinate axis system of an n-th vertex of a jig g detected using a camera m as $P_{g-n}^{CAM-m}$ in the following description in which m is a camera identifier (m=F, R, B, L) and g is a jig identifier (g=1, 2, 3, 4). For example, the identifier g=1 is assigned to the jig 10; the identifier g=2 is assigned to the jig 11; the identifier g=3 is assigned to the jig 12; and the identifier g=4 is assigned to the jig 13. Also, n is a vertex (marker) identifier (n=1, 2, 3) of a jig. For example, the coordinate values in the vehicle local coordinate axis system of the first vertex of the jig 11 (assigned identifier g=2) detected using the camera 21(R) are represented as $P_{2-1}^{CAM-R}$.

Further, the calibration apparatus according to the second embodiment describes the barycentric position of the jig g as $M_g^{CAM-m}$ in the vehicle local coordinate axis system of the camera m, and describes a directional unit vector of a line connecting the barycentric positions of two triangular jigs detected using the camera m as $q^{CAM-m}$. For example, the barycentric position of the jig 11 (assigned identifier g=2) is represented as $M_2^{CAM-R}$ in the vehicle local coordinate axis system of the camera 21(R). Also, for example, a directional unit vector of a line connecting the barycentric position $M_2^{CAM-R}$ of the jig 11 and the barycentric position $M_3^{CAM-R}$ of the jig 12 detected using the camera 21(R) is represented as $q^{CAM-R}$.

Also, the calibration apparatus according to the second embodiment describes, in the following description, the coordinate values in the world coordinate system of a vertex (marker) of a jig detected using the camera m as $P_{m-g-n}^{CAR}$.

Also, the calibration apparatus according to the second embodiment defines, in the following description, a rotation for converting the coordinate values in the vehicle local coordinate axis system of a jig detected using the camera m into coordinate values in the vehicle coordinate system (world coordinate system) as $RotZ(\delta_m)$. Also, the calibration apparatus according to the second embodiment defines, in the following description, a translation for converting the coordinate values in the vehicle local coordinate axis system of a jig detected using the camera m into coordinate values in the vehicle coordinate system (world coordinate system) as Trans ($\epsilon_m$).

The calibration apparatus according to the second embodiment calculates the positions (coordinates) in the vehicle coordinate system of the vertices (markers) of jigs detected using cameras in the following operations. That is, the calibration apparatus causes the origins of the vehicle local coordinate systems representing the positions of jigs detected using respective cameras to match each other. The calibration apparatus calculates parameters (a rotation amount and a translation amount) for moving the barycentric positions of the jigs detected using the respective cameras so as to form the above-described temporary link structure (see FIG. 13).

Figure 13:
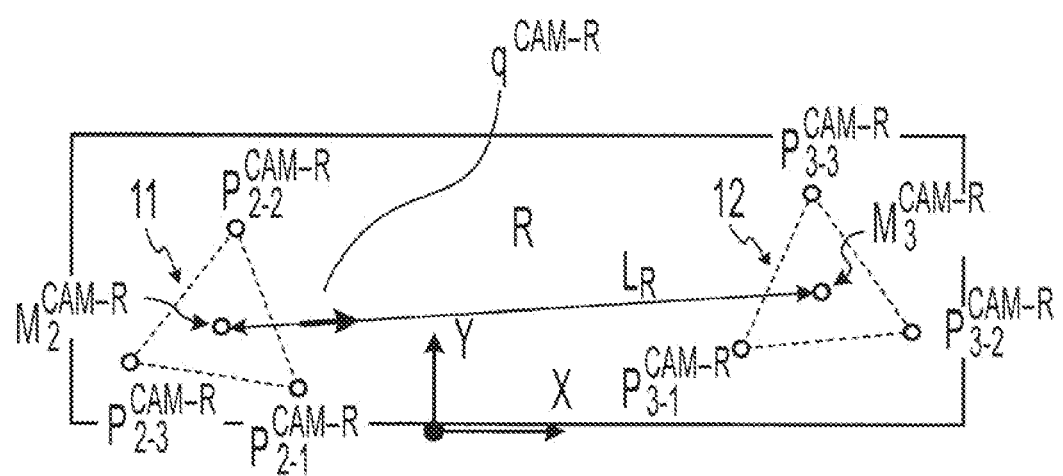
FIG. 13 is a diagram describing calculation of the camera mutual parameters.

Hereinafter, the case in which the positions (coordinates) in the vehicle coordinate system of the vertices (markers) of jigs detected using the camera 21(R) are calculated will be described by way of example. First, the calibration apparatus according to the second embodiment calculates a directional unit vector $q^{CAR-m}$ of a line connecting the barycentric positions of the jigs, based on the already-calculated coordinates of the barycentric positions of the jigs in the vehicle coordinate system (world coordinate system). For example, as illustrated in FIG. 13, the calibration apparatus calculates a directional unit vector $q^{CAM-R}$ of a line connecting the barycentric position $M_2^{CAM-R}$ of the jig 11 and the barycentric position $M_3^{CAM-R}$ of the jig 12 detected using the camera 21(R). FIG. 13 is a diagram describing calculation of camera mutual parameters according to the second embodiment.

Figure 14:
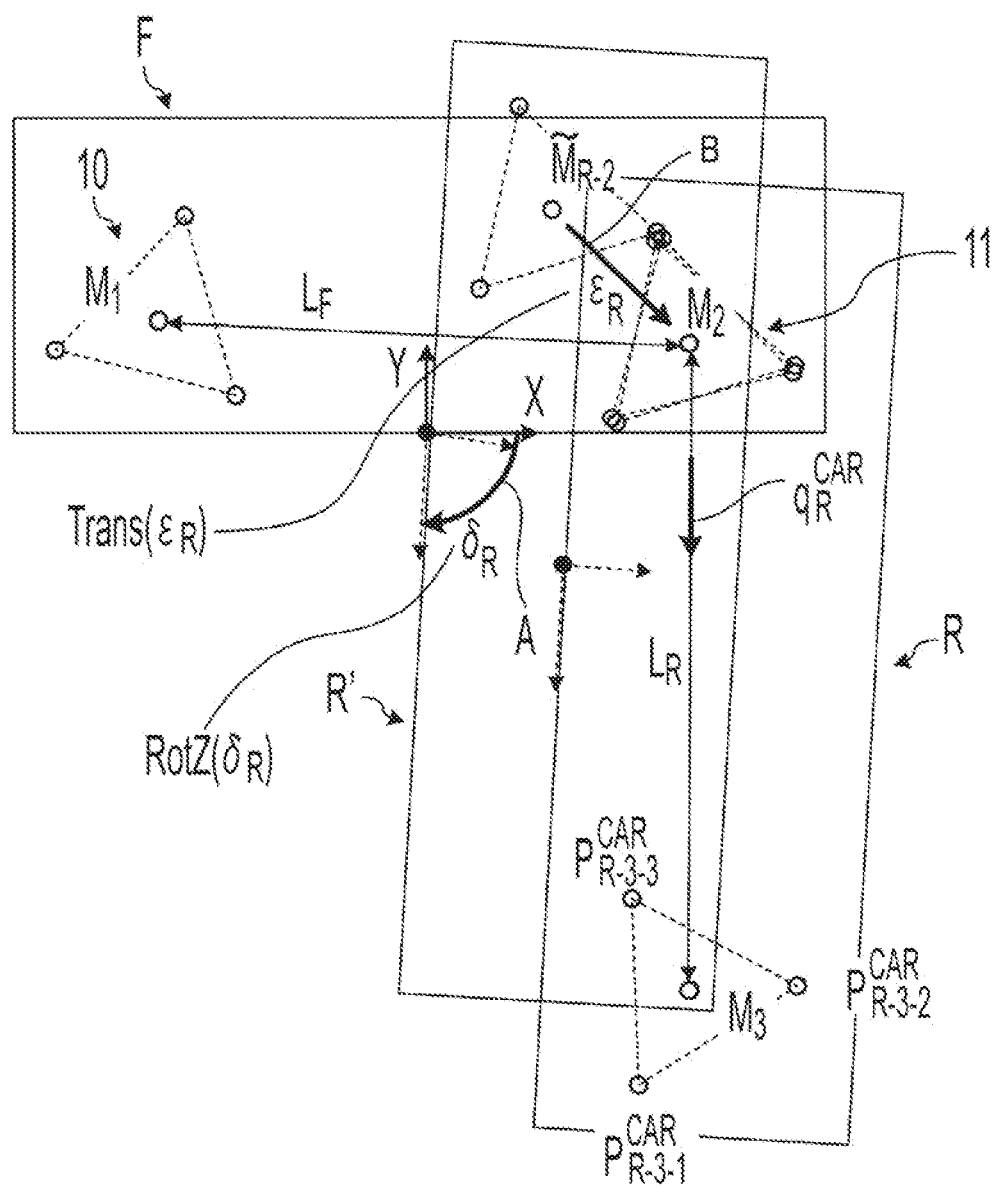
FIG. 14 is a diagram describing calculation of the camera mutual parameters.

Since it has been assumed that the vehicle local coordinate axis system of the camera 20(F) and the vehicle coordinate system (world coordinate system) match each other, the calibration apparatus according to the second embodiment is able to obtain a directional unit vector $q_m^{CAR}$ of a line connecting the barycentric positions of the jigs in the vehicle coordinate system. Note that m is an identifier (m=F, B, R, L) indicating a camera. For example, as illustrated in FIG. 14, the calibration apparatus is able to calculate a directional unit vector $q_R^{CAR}$ connecting the barycentric positions $M_2$ and $M_3$ of the jigs detected using the camera 21(R). FIG. 14 is a diagram describing calculation of camera mutual parameters according to the second embodiment.

Using the calculated directional unit vectors $q^{CAM-m}$ and $q_R^{CAR}$, the calibration apparatus according to the second embodiment calculates a rotation amount $\delta_R$ and a translation amount $\epsilon_m$ for moving the barycentric position $M_2$ of the jig 11 detected using the camera 21(R) so as to form the above-described link structure (FIG. 12).

That is, the calibration apparatus according to the second embodiment causes the origin of the vehicle local coordinate axis system to which the positions of the jigs detected using the camera 20(F) are projected and the origin of the vehicle local coordinate axis system to which the positions of the jigs detected using the camera 21(R) are projected to match each other. Based on the above-described directional unit vectors $q^{CAM-R}$ and $q_R^{CAR}$ as a rough standard, the calibration apparatus calculates the rotation amount $\delta_R$. That is, the calibration apparatus calculates the rotation amount $\delta_R$ (see A in FIG. 14) for rotating the barycentric position $M_2$ of the jig 11 detected using the camera 21(R) so as to match the above-described temporary link structure (FIG. 12). For example, the calibration apparatus calculates the rotation amount $\delta_R$ so that the directional unit vector $q^{CAM-R}$ on R' illustrated in FIG. 14 and the directional unit vector $q_R^{CAR}$ on R illustrated in FIG. 14 become parallel with each other.

Next, based on the above-described directional unit vectors $q^{CAM-R}$ and $q_R^{CAR}$ as a rough standard, the calibration apparatus calculates the translation amount $\epsilon_m$. That is, the calibration apparatus calculates the translation amount $\epsilon_m$ (see B in FIG. 14) so as to match the above-described temporary link structure (FIG. 12). For example, the calibration apparatus calculates the translation amount $\epsilon_m$ for causing the rotated directional unit vector $q^{CAM-R}$ and the unit vector $q_R^{CAR}$ on R illustrated in FIG. 14 to match each other. Using the calculated rotation amount $\delta_R$ and translation amount $\epsilon_m$, the calibration apparatus calculates the positions (coordinates) in the vehicle coordinate system of the vertices (markers) of the jigs detected using the camera 21(R).

The calibration apparatus according to the second embodiment executes operations similar to the above operations (FIG. 14) for all the positions of the jigs detected using the camera 20(F) to the camera 23(L). Accordingly, the calibration apparatus calculates the coordinates of all the vertices of the jigs 10 to 13 in the vehicle coordinate system.

The rotation amount $\delta_m$ indicated in A of FIG. 14 is calculated using equation (16) below:

$$\delta_m = \arctan \frac{q^{CAM-m} \times q_m^{CAR}}{\langle q^{CAM-m}, q_m^{CAR} \rangle} \tag{16}$$

The coordinate values indicating one ($M_g^{CAM-m}$) of the barycentric positions of the jigs rotated based on the rotation amount $\delta_m$ are calculated using equation (17) below. The coordinate values after the rotation correspond to the left side of equation (17):

$$\begin{bmatrix} [\tilde{M}_g^{CAM-m}]^T \\ \ldots \\ 1 \end{bmatrix} = RotZ(\delta m) \cdot \begin{bmatrix} [M_g^{CAM-m}]^T \\ \ldots \\ 1 \end{bmatrix} \tag{17}$$

$$RotZ(\delta_m) = \begin{bmatrix} \cos\delta_m & -\sin\delta_m & 0 & 0 \\ \sin\delta_m & \cos\delta_m & 0 & 0 \\ 0 & 0 & 1 & 0 \\ 0 & 0 & 0 & 1 \end{bmatrix} \tag{18}$$

The translation amount $\epsilon_m$ indicated in B of FIG. 14 is calculated using equation (19) below:

$$\epsilon_m = M_g - \tilde{M}_g^{CAM-m} \tag{19}$$

The coordinates of each vertex (marker) of each jig in the vehicle coordinate system (world coordinate system) are calculated using equations (20) and (21) below:

$$\begin{bmatrix} [P_{m-g-n}^{CAR}]^T \\ \ldots \\ 1 \end{bmatrix} = Trans(\varepsilon_m) RotZ(\delta m) \cdot \begin{bmatrix} [P_{g-n}^{CAM-m}]^T \\ \ldots \\ 1 \end{bmatrix} \tag{20}$$

$$Trans(\varepsilon_m) = \begin{bmatrix} 1 & 0 & 0 & \varepsilon_{m,x} \\ 0 & 1 & 0 & \varepsilon_{m,y} \\ 0 & 0 & 1 & \varepsilon_{m,z} \\ 0 & 0 & 0 & 1 \end{bmatrix} \tag{21}$$

[Calculation of Effective Link Angle when Evaluation of Evaluation Function is at Minimum]

After the positions in the vehicle coordinate system (world coordinate system) of the vertices (markers) of the jigs observed using the cameras 20 to 23 are derived, the calibration apparatus according to the second embodiment calculates, as the effective link angle, the link angle α at which the evaluation value of an evaluation function is at a minimum.

Figure 15:
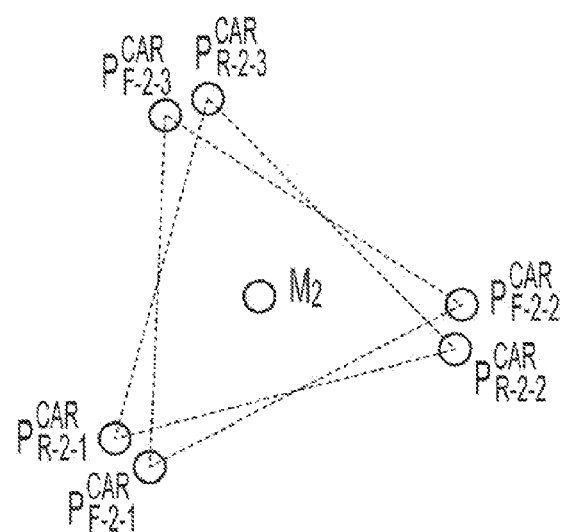
FIG. 15 is a diagram illustrating displacement of the vertices of a jig.

The barycentric position in the vehicle coordinate system (world coordinate system) of each jig observed using any of the cameras is the same for each jig. However, as illustrated in FIG. 15, the positions of the vertices (markers) of each jig are not necessarily the same in the temporary link structure. Therefore, the calibration apparatus according to the second embodiment compares the coordinate values of the same vertices of the same jig observed using different cameras, and calculates, for example, the sum of the absolute values of the differences representing displacement amounts (distances) by using equation (23) below. After the sum of the absolute values of the differences is calculated using equation (23), the calibration apparatus calculates, using the sum of the absolute values of the differences, an evaluation value function E such as equation (22). Using the evaluation function indicated in equation (22), the calibration apparatus calculates the link angle α at which the evaluation value of the evaluation function is at a minimum. This is not limited to the case where the sum of the absolute values of the differences is used, and an evaluation function using the differences may be calculated. FIG. 15 is a diagram illustrating displacement of the vertices of the jig 11 according to the second embodiment.

$$E(\alpha) = Esub(\alpha, L, F, 1) + \\ Esub(\alpha, F, R, 2) + Esub(\alpha, R, B, 3) + Esub(\alpha, B, L, 4) \tag{22}$$

$$Esub(\alpha, m_1, m_2, g) = \sum_{n=1}^{3} |P_{m1-g-n}^{CAR} - P_{m2-g-n}^{CAR}|^2 \tag{23}$$

Parameters $m_1$ and $m_2$ in equation (23) indicate two of the identifiers of the cameras 20 to 23 (F, B, R, L) whose image capturing ranges overlap each other. For example, when the sum of the squared differences between the same vertices of the jig 11 whose images have been overlappingly captured using the camera 20(F) and the camera 21(R) is to be calculated, $m_1$=F and $m_2$=R.

After the link angle α at which the evaluation value of the evaluation value function E indicated in equation (22) above is at a minimum is obtained, the calibration apparatus according to the second embodiment obtains camera mutual parameters (θ, x, y). The camera mutual parameters (θ, x, y) are expressed using equations (24) to (26), respectively:

$$\theta_m = \delta_m \tag{24}$$

$$X_m = \epsilon_{mx} \tag{25}$$

$$Y_m = \epsilon_{my} \tag{26}$$

Figure 16:
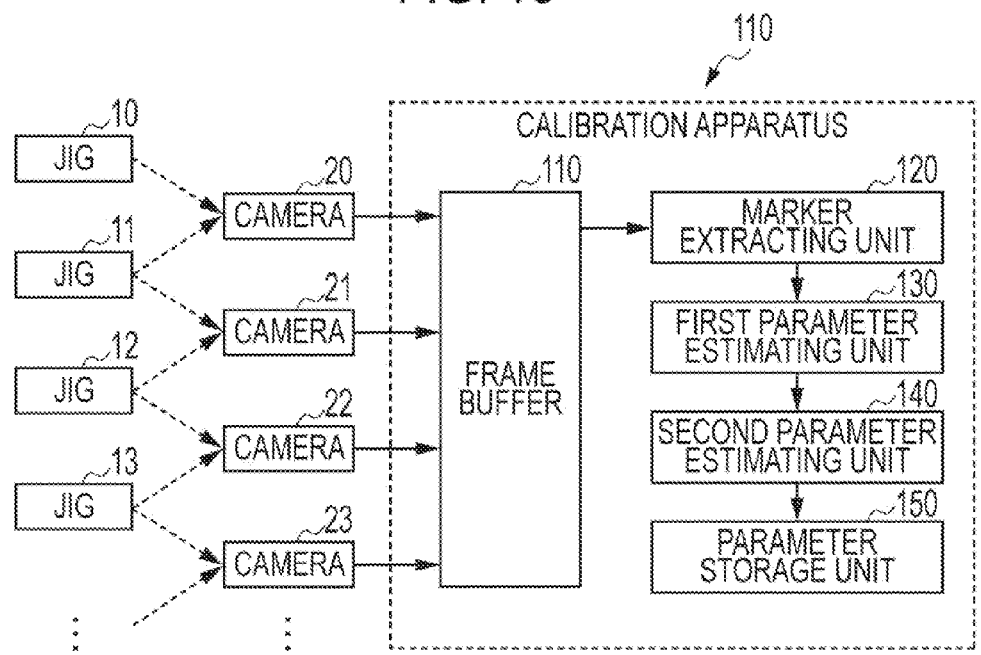
FIG. 16 is a diagram illustrating the configuration of a calibration apparatus according to the second embodiment.

FIG. 16 is a diagram illustrating the configuration of the calibration apparatus according to the second embodiment. As illustrated in FIG. 16, a calibration apparatus 100 according to the second embodiment is connected to the cameras 20 to 23. The calibration apparatus 100 includes a frame buffer 110, a marker extracting unit 120, a first parameter estimating unit 130, a second parameter estimating unit 140, and a parameter storage unit 150. The jigs 10 to 13 illustrated in FIG. 16 correspond to the jig illustrated in FIG. 2 described above. Also, the positional relationship between the jigs 10 to 13 and the cameras 20 to 23 is the same as that illustrated in FIG. 3.

The frame buffer 110 stores images (see FIG. 6) captured using the cameras 20 to 23.

The marker extracting unit 120 obtains image data from the frame buffer 110, and performs a pointing process of specifying the image coordinates of each marker on the image data. For example, the marker extracting unit 120 recognizes images of each marker in the obtained image data by using a known image processing technique, and extracts the recognized marker, thereby performing a pointing process. Further, when performing a pointing process, the marker extracting unit 120 may collectively recognize a set of blinking neighboring pixels exhibiting the same light emitting pattern as a marker, and specify the coordinates of the recognized marker. The marker extracting unit 120 classifies data of the image coordinates of the specified marker according to image data of each camera, and outputs the classified data to the first parameter estimating unit 130.

Alternatively, LEDs that emit light or blink may be used as markers so as to facilitate specification of the positions of the markers. The marker extracting unit 120 may specify the image coordinates of each marker by displaying an image on a pointing device such as a touch panel and detecting the position at which a user's touch pen contacts.

As described above, the first parameter estimating unit 130 calculates parameters ($\psi$, $\phi$, z) for each camera. For example, when the first parameter estimating unit 130 obtains data of the image coordinates of each marker from the marker extracting unit 120, the first parameter estimating unit 130 converts the image coordinates of each marker into a viewing vector $v_n$ by using a conversion table. The first parameter estimating unit 130 obtains H(z) and $n_p$ at which the value of the evaluation function E indicated in equation (6) is at a minimum using, for example, the method of steepest descent. Using the obtained $n_p$ and equations (7) and (8), the first parameter estimating unit 130 calculates the parameters ($\psi$, $\phi$, z) of the camera. The first parameter estimating unit 130 outputs data of the parameters ($\psi$, $\phi$, z) calculated for each camera and data of the viewing vector to the second parameter estimating unit 140.

As described above, the second parameter estimating unit 140 calculates camera mutual parameters ($\theta$, x, y) for each camera. For example, the second parameter estimating unit 140 obtains the relative positional relationship between each camera and jigs in the camera coordinate system by, for example, detecting the positions of the vertices (markers) of the jigs from images of the jigs that have been captured using the cameras 20 to 23. The second parameter estimating unit 140 determines a representative point (e.g., a point corresponding to the barycentric position) that mutually corresponds to the same jigs in two images captured using two of the cameras 20 to 23. While the relative positional relationship between the cameras 20 to 23 and the jigs is maintained, a temporary link structure is formed in which the representative points of the same jigs in two images captured using two cameras are caused to match each other.

After the link structure is formed, the second parameter estimating unit 140 determines the posture of the link structure based on one link angle of the link structure as a parameter, and calculates the vertex coordinates in the vehicle coordinate system of each jig in the case of the determined posture (equations (20) and (21)). The second parameter estimating unit 140 calculates an evaluation function (equation (22)) from the vertex coordinate values in the vehicle coordinate system, and obtains a link angle at which the evaluation value of the evaluation function is at a minimum. For example, the second parameter estimating unit 140 sets an initial value of the link angle $\alpha$, performs the method of steepest descent at increments of a predetermined angle ($\Delta\alpha$), and changes the value of $\alpha$ in a direction in which the evaluation value of the evaluation function E decreases. When the second parameter estimating unit 140 detects $\alpha$ at which the evaluation value of the evaluation function E is at a minimum, the second parameter estimating unit 140 reduces $\Delta\alpha$ to half, conducts a search at yet smaller increments in a direction in which the evaluation value of the evaluation function E decreases, ends the search for the link angle $\alpha$ when $\Delta\alpha$ becomes 0.1 degrees or less, and determines the searched link angle $\alpha$ as the effective link angle.

After the effective link angle is obtained, the second parameter estimating unit 140 calculates camera mutual parameters ($\theta$, x, y), based on the obtained effective link angle, for each camera (equations (24) to (26)).

The flow of a process performed by the second parameter estimating unit 140 will be described in more detail in a description of the flow of a process described later.

The parameter storage unit 150 stores the parameters ($\psi$, $\theta$, $\phi$, x, y, z) for each camera. The camera parameters stored in the parameter storage unit 150 are used by various applications. For example, the parameters ($\psi$, $\theta$, $\phi$, x, y, z) stored for each camera by the parameter storage unit 150 are used by an application for generating a down shot image.

The parameter storage unit 150 is a semiconductor memory device such as a random-access memory (RAM), a read-only memory (ROM), or a flash memory, or a storage device such as a hard disk or an optical disk.

The first parameter estimating unit 130 and the second parameter estimating unit 140 are integrated circuits (ICs) such as application specific integrated circuits (ASICs) or field programmable gate arrays (FPGAs). The first parameter estimating unit 130 and the second parameter estimating unit 140 are electronic circuits such as central processing units (CPUs) or microprocessing units (MPUs).

Processes in the Second Embodiment

Figure 17:
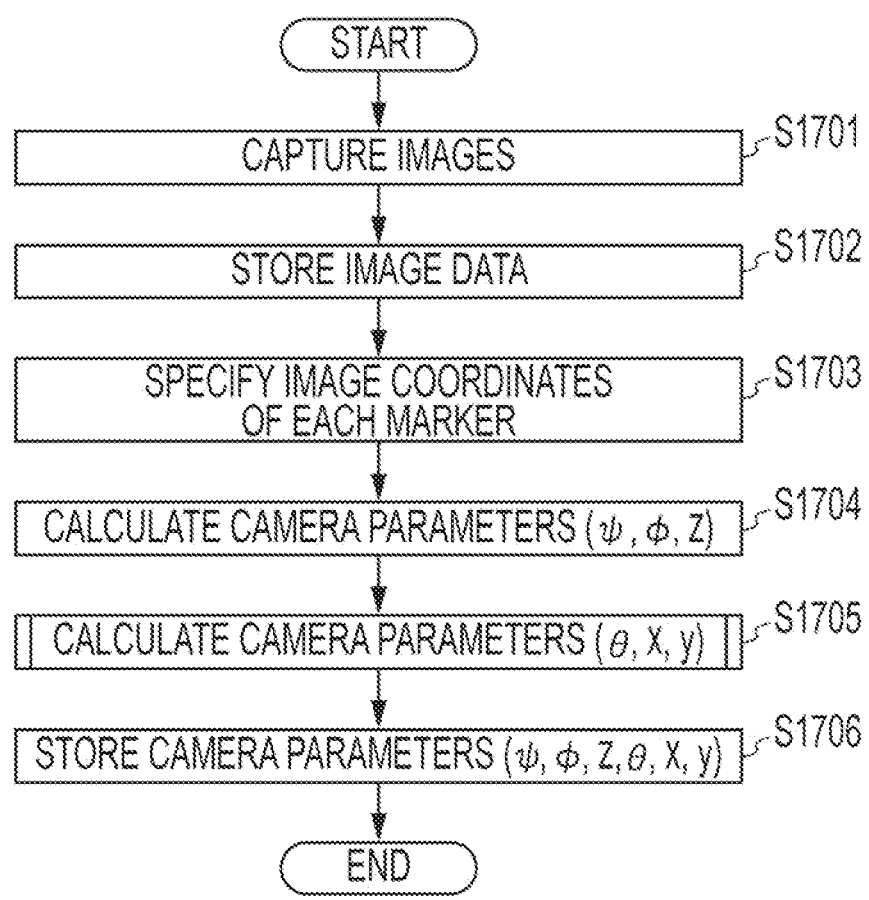
FIG. 17 is a flowchart illustrating the flow of a process performed by the calibration apparatus according to the second embodiment.

FIGS. 17 to 20 are flowcharts each illustrating the flow of a process performed by the calibration apparatus according to the second embodiment. Using FIG. 17, the overall flow of a process performed by the calibration apparatus according to the second embodiment will be described. As illustrated in FIG. 17, the cameras 20 to 23 capture images for the calibration apparatus 100 (operation S1701), and the frame buffer 110 stores image data (operation S1702).

Then, the marker extracting unit 120 specifies the image coordinates of each marker based on the image data (operation S1703), and the first parameter estimating unit 130 calculates parameters ($\psi$, $\phi$, z) of each camera (operation S1704).

The second parameter estimating unit 140 calculates parameters ($\theta$, x, y) of each camera (operation S1705), and the parameter storage unit 150 stores the parameters ($\psi$, $\theta$, $\phi$, x, y, z) of each camera (operation S1706). The processing in operation S1705 will be described in detail later using FIG. 18.

Figure 18:
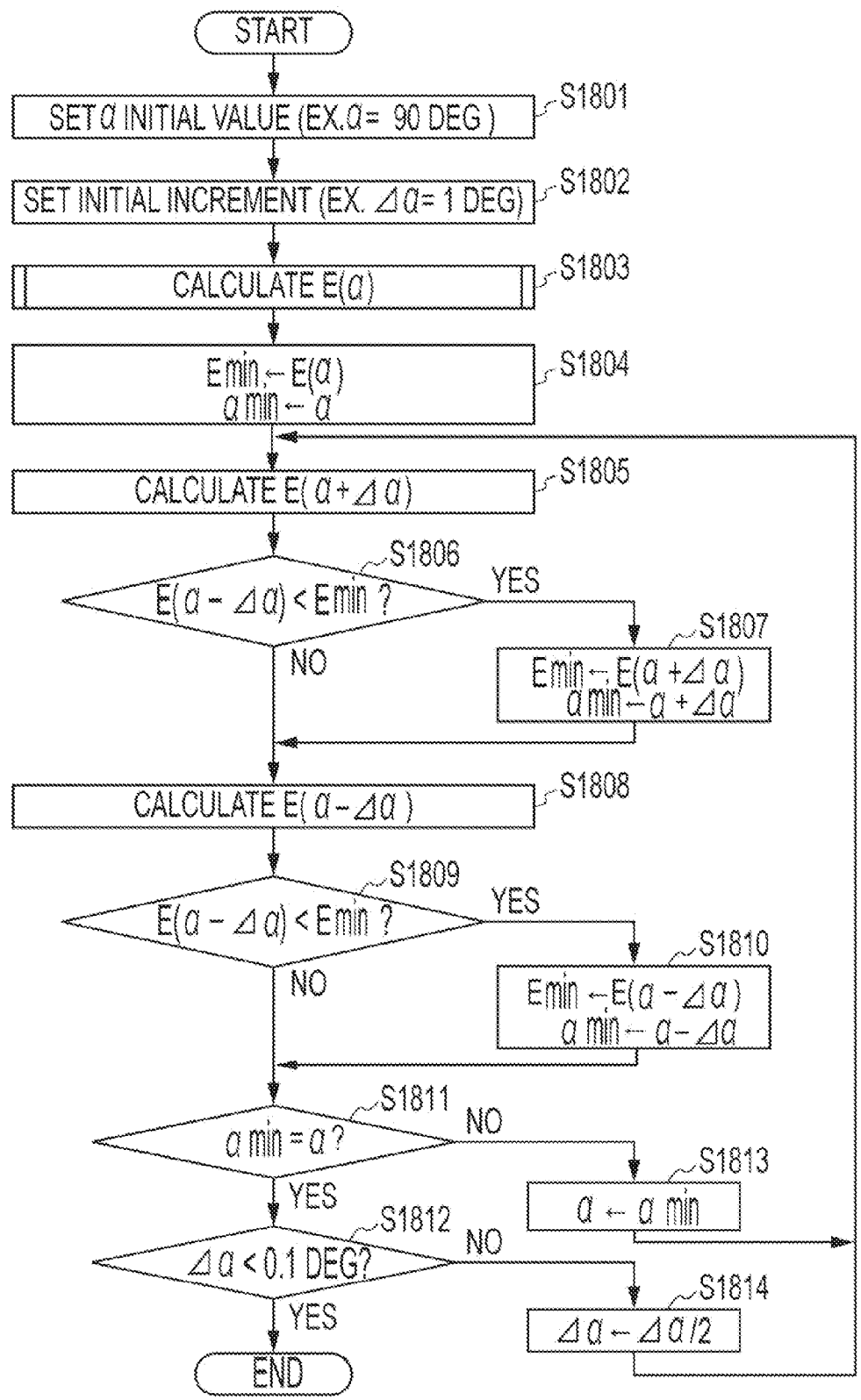
FIG. 18 is a flowchart illustrating the flow of a process performed by the calibration apparatus according to the second embodiment.

Referring now to FIG. 18, the flow of a process of searching for a link angle $\alpha$ using the second parameter estimating unit 140 will be described. For example, when calculation of the parameters ($\theta$, x, y) using the first parameter estimating unit 130 is completed, the second parameter estimating unit 140 starts a process of searching for a link angle $\alpha$.

That is, the second parameter estimating unit 140 sets an initial value of the link angle $\alpha$ (e.g., $\alpha$=90 deg) (operation S1801), and sets an initial increment (e.g., $\Delta\alpha$=1 deg) of $\alpha$ in the search process using the method of steepest descent (operation S1802). The second parameter estimating unit 140 calculates an evaluation value E($\alpha$) of an evaluation function E (equation 22) in the case of the link angle $\alpha$ (operation S1803). The processing in operation S1803 will be described in detail later using FIG. 19.

After E($\alpha$) is calculated, the second parameter estimating unit 140 sets the calculated E($\alpha$) as a minimum value (E min), and sets the initial value of the link angle $\alpha$ as a minimum value (α min) (operation S1804). The second parameter estimating unit 140 calculates the evaluation value E (α+Δα) of the evaluation equation E (equation 22) in the case of the link angle α+Δα obtained by increasing the link angle α by the initial increment (operation S1805).

After E(α+Δα) is calculated, the second parameter estimating unit 140 determines whether the calculated E(α+Δα) is less than the minimum value "E min" (operation S1806). When the determination result indicates that E(α+Δα) is less than "E min" (YES in operation S1806), the second parameter estimating unit 140 sets E(α+Δα) as the minimum value (E min) (operation S1807). Further, the second parameter estimating unit 140 sets the link angle α+Δα as the minimum value (α min) (operation S1807). The second parameter estimating unit 140 calculates the evaluation value E (α−Δα) of the evaluation function E (equation 22) in the case of the link angle α−Δα obtained by decreasing the link angle α by the initial increment (operation S1808).

The description now returns to operation S1806. When the determination result indicates that E(α+Δα) is not less than "E min" (NO in operation S1806), the second parameter estimating unit 140 proceeds to the processing in operation S1808 described above.

After E(α−Δα) is calculated, the second parameter estimating unit 140 determines whether the calculated E(α−Δα) is less than the minimum value "E min" (operation S1809). When the determination result indicates that E(α−Δα) is less than "E min" (YES in operation S1809), the second parameter estimating unit 140 sets E(α−Δα) as the minimum value (E min) (operation S1810). Further, the second parameter estimating unit 140 sets the link angle α−Δα as the minimum value (α min) (operation S1810). The second parameter estimating unit 140 determines whether the link angle α is equal to "α min" (operation S1811).

When the determination result indicates that the link angle α is equal to "α min" (YES in operation S1811), the second parameter estimating unit 140 determines whether Δα is less than, for example, 0.1 degrees (operation S1812). When the determination result indicates that Δα is less than 0.1 degrees (YES in operation S1812), the second parameter estimating unit 140 outputs "α min" at that time, ends the process of searching for a link angle α, and determines the searched link angle α as the effective link angle. The second parameter estimating unit 140 calculates the parameters (θ, x, y) of each camera using the output effective link angle α.

The description now returns to operation S1811. When the determination result indicates that the link angle α is not equal to "α min" (NO in operation S1811), the second parameter estimating unit 140 sets "α min" as α, and returns to the processing in operation S1805 described above.

The description now returns to operation S1812. When the determination result indicates that Δα is not less than 0.1 degrees (NO in operation S1812), the second parameter estimating unit 140 reduces Δα to half (operation S1814), and returns to the processing in operation S1805 described above.

The above-described process of searching for a link angle α (FIG. 18) has been described using the case in which an angle to search for is set each time in accordance with the determination result of the angle detected by the search and a threshold, and a link angle that serves as a minimum is searched for. However, the process is not limited to this case. From the beginning of the process, an angle to search for may be set to a settable minimum value, and a link angle that serves as a minimum may be searched for at fine intervals.

Figure 19:
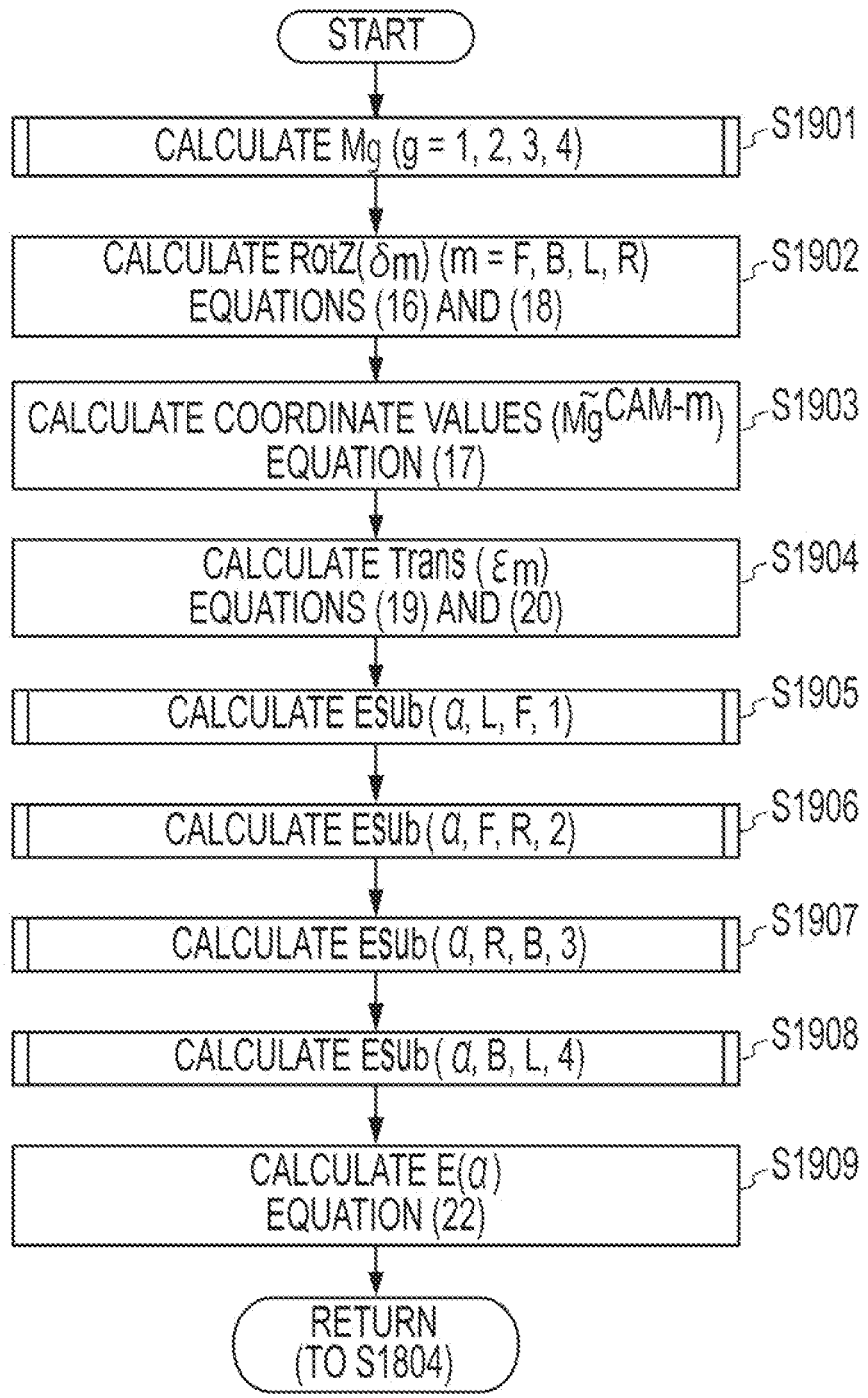
FIG. 19 is a flowchart illustrating the flow of a process performed by the calibration apparatus according to the second embodiment.

Referring now to FIG. 19, the flow of a process of calculating the evaluation value E (α) of the evaluation function E (equation 22) using the second parameter estimating unit 140 will be described. The second parameter estimating unit 140 assumes that the vehicle local coordinate axis system of the camera 20(F) and the vehicle coordinate system (world coordinate system) match each other. As illustrated in FIG. 19, the second parameter estimating unit 140 calculates the coordinates $M_g$ (g=1, 2, 3, 4) of the barycentric position of each jig in the vehicle coordinate system (operation S1901). The processing in operation S1901 will be described in detail later using FIG. 20.

After $M_g$ (g=1, 2, 3, 4) are calculated, the second parameter estimating unit 140 calculates a matrix $RotZ(\delta_m)$ (m=F, B, L, R) representing a rotation by using equations (16) and (18) described above (operation S1902). That is, the second parameter estimating unit 140 calculates the matrix $RotZ(\delta_m)$ representing a rotation for converting the position in the vehicle local coordinate axis system of each jig detected using the camera m into a position in the vehicle coordinate system (world coordinate system).

After $RotZ(\delta_m)$ is calculated, the second parameter estimating unit 140 calculates the coordinate values when the positions of the vertices of each jig are rotated, by using equation (17) described above (operation S1903). After the coordinate values are calculated, the second parameter estimating unit 140 calculates a matrix $Trans(\epsilon_m)$ representing a translation by using equations (19) and (21) described above (operation S1904).

After $Trans(\epsilon_m)$ is calculated, the second parameter estimating unit 140 compares the coordinate values of the same vertices of the same jig, and calculates the sum (Esub) of the absolute values of the differences representing displacement amounts (distances) by using equation (23) described above (operations S1905 to S1908). That is, the second parameter estimating unit 140 calculates the coordinate values obtained by converting the position of each vertex of each jig in the vehicle local coordinate axis system into a position in the vehicle coordinate system (world coordinate system) by using equation (20) described above using $RotZ(\delta_m)$ and $Trans(\epsilon_m)$. The second parameter estimating unit 140 calculates the above-described sum (Esub) of the absolute values of the differences by using the calculated coordinate values of each vertex of each jig. The processing in operations S1905 to S1908 will be described in detail later using FIG. 21.

After the sum of the absolute values of the differences is calculated, the second parameter estimating unit 140 sets the sum of the absolute values of the differences as an evaluation function, thereby calculating the evaluation function E(α) indicated in equation (22) described above (operation S1909).

Figure 20:
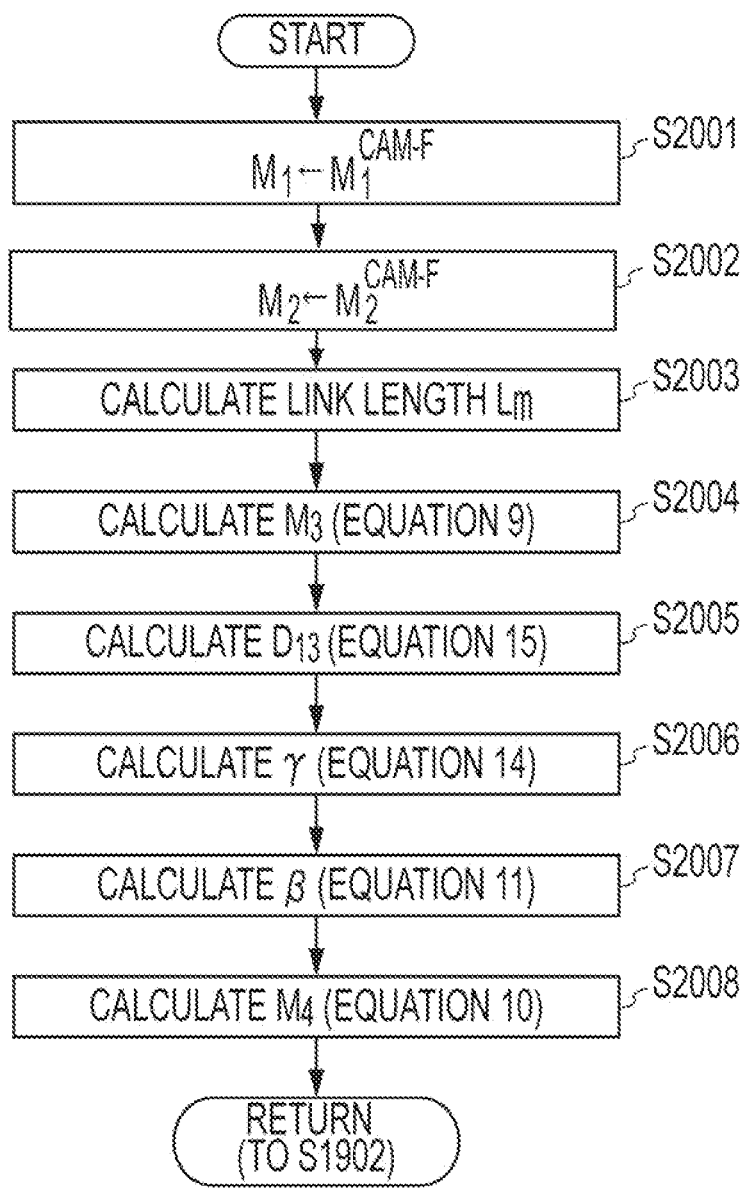
FIG. 20 is a flowchart illustrating the flow of a process performed by the calibration apparatus according to the second embodiment.

Referring now to FIG. 20, the flow of a process of calculating the coordinates $M_g$ (g=1, 2, 3 4) of the barycentric position of each jig using the second parameter estimating unit 140 will be described. As illustrated in FIG. 20, the second parameter estimating unit 140 sets, as the coordinates of the point $M_1$ corresponding to the barycentric position of the jig 10, the known value ($M_1^{CAM-F}$) in the vehicle local coordinate axis system of the camera 20(F) (operation S2001). Similarly, the second parameter estimating unit 140 sets, as the coordinates of the point $M_2$ corresponding to the barycentric position of the jig 11, the known value ($M_2^{CAM-F}$) in the vehicle local coordinate axis system of the camera 20(F) (operation S2002).

Next, the second parameter estimating unit 140 calculates the link length $L_m$ (m=F, B L, R) which is the distance between the barycentric positions (operation S2003). The second parameter estimating unit 140 calculates, as an angle α formed by the X-coordinate axis of the vehicle local coordinate axis system and the link $L_R$, the coordinates of the point $M_3$ corresponding to the barycentric position of the jig 12 by using equation (9) described above (operation S2004).

After $M_3$ is calculated, the second parameter estimating unit 140 calculates a distance $D_{13}$ between the point $M_1$ corresponding to the barycentric position of the jig 10 and the point $M_3$ corresponding to the barycentric position of the jig 12 by using equation (15) described above (operation S2005). The second parameter estimating unit 140 calculates an angle γ corresponding to the angle $M_3M_1M_4$ (see FIG. 12) using equation (14) described above (operation S2006). The second parameter estimating unit 140 calculates an angle β corresponding to the angle $M_2M_1M_3$ using equation (11) described above (operation S2007).

The second parameter estimating unit 140 substitutes the angle (β+γ) in equation (10) described above, thereby obtaining the coordinates of the point $M_4$ corresponding to the barycentric position of the jig 13 (operation S2008). Thereafter, the second parameter estimating unit 140 proceeds to the processing in operation S1902 illustrated in FIG. 19 described above.

Figure 21:
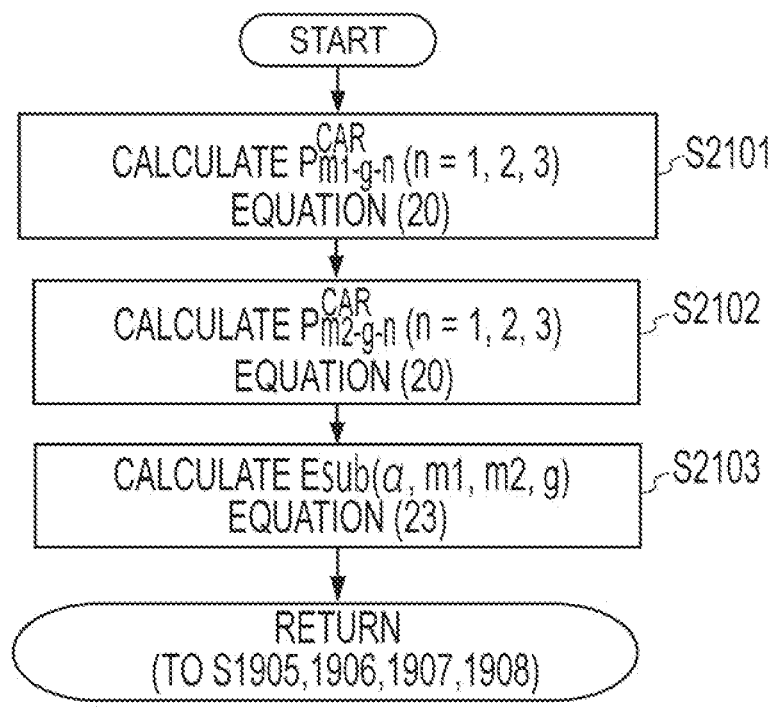
FIG. 21 is a flowchart illustrating the flow of a process performed by the calibration apparatus according to the second embodiment.

Referring now to FIG. 21, the flow of a process of calculating the sum (Esub) of the absolute values of the differences, which is illustrated in operations S1905 to S1908 of FIG. 19, is illustrated. As illustrated in FIG. 21, the second parameter estimating unit 140 calculates the coordinate values in the vehicle coordinate system (world coordinate system) of each vertex of each jig by using equation (20) described above (operations S2101 and S2102). For each jig, the second parameter estimating unit 140 calculates the sum of the absolute values of the differences representing the distances between the same vertices of the same jig by using equation (23) described above (operation S2103). Thereafter, the second parameter estimating unit 140 proceeds to the processing in operation S1909 illustrated in FIG. 19.

As has been described above, the calibration apparatus 100 according to the second embodiment captures images of jigs each including a plurality of markers a distance between which is predetermined and known (e.g., D) by using the cameras 20 to 23. The calibration apparatus 100 according to the second embodiment specifies the positions of the markers included in the jigs from the captured images, thereby calculating parameters (ψ, θ, φ, x, y, z) of each camera. Unlike the related art, the positions at which the jigs and the cameras are arranged need not to be strict. As a result, the cameras are easily calibrated, resulting in a reduction of the burden on the user.

The calibration apparatus 100 according to the second embodiment forms a temporary link structure in which the points of the same jigs in two images captured using two cameras are caused to match each other while maintaining the relative positional relationship between the cameras and the jigs. After the temporary link structure is formed, the calibration apparatus 100 determines the posture of the link structure based on one temporary link angle of the temporary link structure as a parameter, and calculates the coordinates of the vertices in the vehicle coordinate system of each jig in the case of the determined posture. After the coordinates of the vertices are calculated, the calibration apparatus 100 calculates an evaluation function based on the coordinates of the vertices in the vehicle coordinate system, and obtains an effective link angle of an effective link structure at which the evaluation value of the evaluation function is at a minimum. After the effective link angle is obtained, the calibration apparatus 100 calculates camera mutual parameters (θ, x, y) (taking the relative positional relationship among the cameras into consideration). That is, the calibration apparatus 100 obtains the optimum value of the link angle which uniquely specifies the link structure, and determines the posture of the link structure. Accordingly, the calibration apparatus 100 is able to perform a process of determining the optimum values of twelve parameters in total for four cameras, corresponding to the three camera mutual parameters (θ, x, y), by performing processing based on one parameter, namely, the link angle, instead. Therefore, the calibration apparatus 100 is able to greatly reduce the number of other parameters involved in calculating the camera mutual parameters (θ, x, y), and is able to easily perform camera calibration in a short period of time.

The calibration apparatus 100 according to the second embodiment is able to estimate the relative positional relationship among the cameras since the calibration apparatus 100 captures, using the individual cameras, images of the jigs arranged in portions where the fields of view of adjacent cameras overlap. As a result, camera parameters involved in generating a down shot image, an entire circumferential image, or a 360-degree panoramic image are obtained at the same time.

The positional relationship between the cameras 20 to 23 and the jigs 10 to 13 is not limited to that illustrated in FIG. 3 described above. Specifically, the arrangement of the cameras 20 to 23 and the jigs 10 to 13 may be changed when the following conditions are satisfied. That is, one screen captured using each camera includes a plurality of jigs, and the jigs in the screen include one jig including at least two markers and another jig including at least three markers; and images of the same jig are captured using a plurality of cameras. The shape of the jigs is not limited to that illustrated in FIG. 2. Jigs with any shape may be used as long as the shape allows determination of a common representative point between the same jigs in two images captured using two cameras.

Third Embodiment (1) Configuration of the Calibration Apparatus

The elements of the calibration apparatus 100 illustrated in FIG. 16 are functionally conceptual, and the calibration apparatus 100 need not physically include these elements. That is, the specific embodiment of disintegration and integration of the calibration apparatus 100 is not limited to that illustrated, and, for example, the first parameter estimating unit 130 and the second parameter estimating unit 140 may be functionally or physically integrated. Accordingly, all or some of the elements of the calibration apparatus 100 may be functionally or physically disintegrated or integrated in arbitrary units in accordance with various loads, the usage circumstance, and the like.

(2) Program of Calibration Processes Executed by a Computer

Various processes (e.g., see FIGS. 17 to 21) of the calibration apparatus 100 described in the second embodiment above may be realized by executing a prepared program using a computer system such as a personal computer or a workstation.

Figure 22:
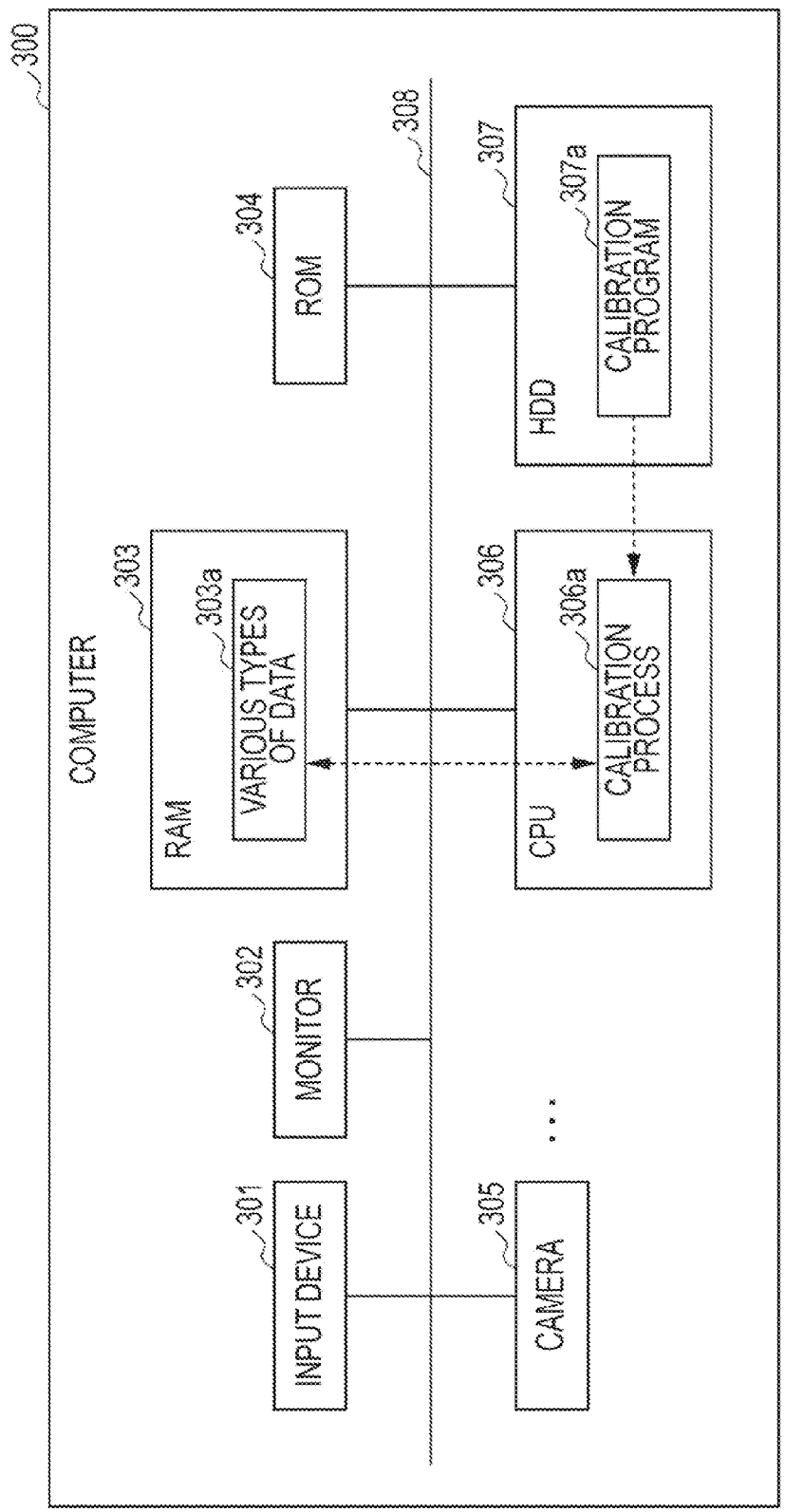
FIG. 22 is a diagram illustrating an example of a computer that executes a calibration process.

Referring now to FIG. 22, an example of a computer that executes a calibration program that realizes the same functions as the processing performed by the calibration apparatus 100 described in the second embodiment above will be described. FIG. 22 is a diagram illustrating an example of a computer that executes a calibration process.

As illustrated in FIG. 22, a computer 300 that functions as the calibration apparatus 100 includes an input device 301, a monitor 302, a RAM 303, and a ROM 304. The computer 300 further includes cameras 305 that capture images (images including jigs), a CPU 306, and a hard disk drive (HDD) 307.

The computer 300 mutually connects the input device 301, the monitor 302, the RAM 303, the ROM 304, the cameras 305, the CPU 306, and the HDD 307 using a bus 308.

A calibration program 307a that serves as the same functions as those of the calibration apparatus 100 described above is stored in the HDD 307. Alternatively, the calibration program 307a may be disintegrated as occasion calls, and may be stored in a storage unit of another computer connected to the computer 300 so as to be communicable with the computer 300 via a network.

The CPU 306 reads the calibration program 307a from the HDD 307 and expands the calibration program 307a in the RAM 303, and, as illustrated in FIG. 22, the calibration program 307a functions as a calibration process 306a.

That is, the calibration process 306a expands various types of data 303a such as image data obtained using the cameras 305 in a region allocated thereto in the RAM 303, and executes various processes based on the expanded data 303a.

The calibration process 306a corresponds particularly to processes executed using the marker extracting unit 120, the first parameter estimating unit 130, and the second parameter estimating unit 140 illustrated in FIG. 16.

The calibration program 307a need not necessarily be stored in the HDD 307 from the beginning. For example, individual programs may be stored in "portable physical media" such as a flexible disk (FD), a compact-disc read-only memory (CD-ROM), a digital versatile disk (DVD), a magneto-optical disk, and an integrated circuit (IC) card inserted in the computer 300, and the computer 300 may read and execute these programs.

Further, individual programs may be stored in "other computers (or servers)" connected to the computer 300 via a public circuit, the Internet, a local area network (LAN), and/or a wide area network (WAN), and the computer 300 may read and execute these programs.

According to an embodiment of the techniques disclosed by the present application, camera calibration is easily performed in a short period of time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A calibration apparatus comprising:
    a memory; and
    a processor coupled to the memory, the processor configured to:
        obtain first and second images captured by two cameras of a plurality of cameras mounted on an object, the first image including images of a first marker set and a second marker set, the second image including images of a first marker set and a third marker set, each of the first, second and third marker sets including a plurality of markers,
        form a closed-link structure based on a first representative point of the first marker set and a second representative point of the second marker set in the first image, and a first representative point of the first marker set and a third representative point of the third marker set in the obtained second image, the first representative points in the first and second images being matched each other in the closed-link structure,
        determine a link angle of the closed-link structure when a difference representing a distance between the images of the same marker of the first marker set in the first and second images satisfy a given condition, and
        determine a parameter for positioning at least one of the plurality of cameras based on the determined link angle, wherein
    the processor is further configured to form the closed-link structure by detecting the image of the first marker set of the first image and the image of the first marker set of the second image,
        forming a first line connecting the first representative point which is at a given position in the image of the first marker set and the second representative point which is at a given position in the image of the second marker set in the first image,
        forming a second line connecting the first representative point which is at a given position in the image of the first marker set and the third representative point which is at a given position in the image of the third marker set in the second image,
        arranging the lines so that the first representative points in the first and second images are matched with each other, and
        forming the closed-link structure including the first and second lines through the matched first representative point, the link angle of the closed-link structure being specified by an angle between the first and second lines.

2. The calibration apparatus according to claim 1, wherein the processor is further configured to determine the link angle by using a function derived from the difference representing the distance between the images of the same marker of the first marker set in the first and second images.

3. The calibration apparatus according to claim 1, wherein the parameter includes at least one of a camera pan angle, an x-axis coordinate, and a y-axis coordinate.

4. The calibration apparatus according to claim 1, wherein the processor is further configured to determine the link angle when the difference representing the distance between the images of the same marker of the first marker set in the arranged first and second images is at a minimum.

5. The calibration apparatus according to claim 1, wherein the processor is further configured to determine the parameter for each of the plurality of cameras so that image capturing ranges of two of the plurality of cameras overlap each other.

6. The calibration apparatus according to claim 1, wherein the closed-link structure is a structure in which links form a closed chain in which mobility is constrained.

7. A calibration method comprising:
    obtaining first and second images captured by two cameras of a plurality of cameras mounted on an object, the first image including images of a first marker set and a second marker set, the second image including images of a first marker set and a third marker set, each of the first, second and third marker sets including a plurality of markers;
    forming a closed-link structure based on a first representative point of the first marker set and a second representative point of the second marker set in the first image, and a first representative point of the first marker set and a third representative point of the third marker set in the obtained second image, the first representative points in the first and second images being matched each other in the closed-link structure;

determining, with a processor, a link angle of the closed-link structure when a difference representing a distance between the images of the same marker of the first marker set in the first and second images satisfy a given condition; and determining a parameter for positioning at least one of the plurality of cameras based on the determined link angle, wherein the forming includes detecting the image of the first marker set of the first image and the image of the first marker set of the second image, forming a first line connecting the first representative point which is at a given position in the image of the first marker set and the second representative point which is at a given position in the image of the second marker set in the first image, forming a second line connecting the first representative point which is at a given position in the image of the first marker set and the third representative point which is at a given position in the image of the third marker set in the second image, arranging the lines so that the first representative points in the first and second images are matched with each other, and forming the closed-link structure including the first and second lines through the matched first representative point, the link angle of the closed-link structure being specified by an angle between the first and second lines.

8. The calibration method according to claim 7, wherein the determining determines the link angle by using a function derived from the difference representing the distance between the images of the same marker of the first marker set in the first and second images.

9. The calibration method according to claim 7, wherein the parameter includes at least one of a camera pan angle, an x-axis coordinate, and a y-axis coordinate.

10. The calibration method according to claim 7, wherein the determining the link angle includes determining the link angle when the difference representing the distance between the images of the same marker of the first marker set in the arranged first and second images is at a minimum.

11. The calibration method according to claim 7, wherein the determining the parameter includes determining the parameter for each of the plurality of cameras so that image capturing ranges of two of the plurality of cameras overlap each other.

12. A non-transitory computer readable storage medium storing a calibration program allowing a processor to execute an operation, the operation comprising:

obtaining first and second images captured by two cameras of a plurality of cameras mounted on an object, the first image including images of a first marker set and a second marker set, the second image including images of a first marker set and a third marker set, each of the first, second and third marker sets including a plurality of markers;

forming a closed-link structure based on a first representative point of the first marker set and a second representative point of the second marker set in the first image, and a first representative point of the first marker set and a third representative point of the third marker set in the obtained second image, the first representative points in the first and second images being matched each other in the closed-link structure;

determining a link angle of the closed-link structure when a difference representing a distance between the images of the same marker of the first marker set in the first and second images satisfy a given condition; and determining a parameter for positioning at least one of the plurality of cameras based on the determined link angle, wherein the forming includes detecting the image of the first marker set of the first image and the image of the first marker set of the second image, forming a first line connecting the first representative point which is at a given position in the image of the first marker set and the second representative point which is at a given position in the image of the second marker set in the first image, forming a second line connecting the first representative point which is at a given position in the image of the first marker set and the third representative point which is at a given position in the image of the third marker set in the second image, arranging the lines so that the first representative points in the first and second images are matched with each other, and forming the closed-link structure including the first and second lines through the matched first representative point, the link angle of the closed-link structure being specified by an angle between the first and second lines.

13. The non-transitory computer readable storage medium according to claim 12, wherein the determining determines the link angle by using a function derived from the difference representing the distance between the images of the same marker of the first marker set in the first and second images.

14. The non-transitory computer readable storage medium according to claim 12, wherein the parameter includes at least one of a camera pan angle, an x-axis coordinate, and a y-axis coordinate.

15. The non-transitory computer readable storage medium according to claim 12, wherein the determining the link angle includes determining the link angle when the difference representing the distance between the images of the same marker of the first marker set in the arranged first and second images is at a minimum.

16. The non-transitory computer readable storage medium according to claim 12, wherein the determining the parameter includes determining the parameter for each of the plurality of cameras so that image capturing ranges of two of the plurality of cameras overlap each other.

* * * * *